United States Patent
Bernardi et al.

(10) Patent No.: US 10,213,897 B2
(45) Date of Patent: Feb. 26, 2019

(54) CLAMPING APPARATUS WITH CONTROL MECHANISM FOR SPRING-ACTUATED LEVER

(71) Applicants: Robert Bosch Tool Corporation, Broadview, IL (US); Robert Bosch GmbH, Stuttgart (DE)

(72) Inventors: Walter Bernardi, Highland Park, IL (US); Daniel Schadegg, Buffalo Grove, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 35 days.

(21) Appl. No.: 15/471,920

(22) Filed: Mar. 28, 2017

(65) Prior Publication Data

US 2017/0282329 A1 Oct. 5, 2017

Related U.S. Application Data

(60) Provisional application No. 62/316,721, filed on Apr. 1, 2016.

(51) Int. Cl.
| | |
|---|---|
| *B24B 45/00* | (2006.01) |
| *B23B 31/10* | (2006.01) |
| *B23B 31/19* | (2006.01) |
| *B27B 19/00* | (2006.01) |
| *B27B 5/32* | (2006.01) |
| *B24B 23/04* | (2006.01) |

(52) U.S. Cl.
CPC ............ *B24B 45/006* (2013.01); *B23B 31/10* (2013.01); *B23B 31/19* (2013.01); *B24B 23/04* (2013.01); *B27B 5/32* (2013.01); *B27B 19/006* (2013.01); *Y10T 279/33* (2015.01)

(58) Field of Classification Search
CPC ......... B23B 31/10; B23B 31/19; B24B 23/04; B24B 45/006; B27B 5/32; B27B 19/006; Y10T 279/33
See application file for complete search history.

(56) References Cited

U.S. PATENT DOCUMENTS 5,489,285 A * 2/1996 Goris ..................... B23D 51/10
606/176
9,067,293 B2 6/2015 Bernardi et al.
(Continued)

*Primary Examiner* — Eric A Gates
(74) *Attorney, Agent, or Firm* — Kathy K. Takeguchi; Maginot Moore & Beck LLP

(57) ABSTRACT

A clamping apparatus with a control mechanism includes a cam, a cam post, a handle, and a handle plate. The cam is configured to rotate into a clamped position in which the clamping apparatus is in a clamped state and an unclamped position in which the clamping apparatus is in an unclamped state. The cam post is rotatable with the cam. The handle is movable into a first position and a second position. The handle plate is rotatable with the handle. The handle plate is configured to rotate the cam post in a first direction when the handle moves from the first position to the second position. The handle plate is configured to rotate in a second direction without rotating the cam post in the second direction for a predetermined distance when the handle moves from the second position to the first position. The first direction is opposite to the second direction.

20 Claims, 17 Drawing Sheets

(56) References Cited

U.S. PATENT DOCUMENTS

| | | | |
|---|---|---|---|
| 2002/0000698 A1* | 1/2002 | Rohm | B23B 31/1207 279/62 |
| 2010/0197208 A1 | 8/2010 | Blickle et al. | |
| 2011/0266759 A1 | 11/2011 | Goldman | |
| 2013/0193655 A1* | 8/2013 | Kaye, Jr. | B27B 19/006 279/141 |
| 2014/0068952 A1* | 3/2014 | Soreo | B27B 19/008 30/369 |
| 2014/0084552 A1 | 3/2014 | Zieger et al. | |
| 2014/0183828 A1* | 7/2014 | Xu | B27B 19/006 279/141 |
| 2014/0190715 A1* | 7/2014 | Wong | B25B 21/00 173/39 |
| 2014/0191481 A1* | 7/2014 | Kawakami | B23Q 3/14 279/142 |
| 2015/0042052 A1* | 2/2015 | Furusawa | B24B 23/04 279/141 |
| 2015/0075830 A1* | 3/2015 | Zhang | B24B 23/04 173/213 |

* cited by examiner

CLAMPING APPARATUS WITH CONTROL MECHANISM FOR SPRING-ACTUATED LEVER

CROSS-REFERENCE TO RELATED APPLICATION

This application claims the benefit of U.S. Provisional Patent Application No. 62/316,721, which was filed on Apr. 1, 2016, and which is hereby incorporated herein by reference in its entirety.

FIELD

This disclosure relates generally to clamping apparatuses, and more specifically to clamping apparatuses with levers.

BACKGROUND

There are several different types of clamping apparatuses. For example, one-type of clamping apparatus includes a spring-actuated lever, which is configured to transition the clamping apparatus from a clamped state to an unclamped state, and vice versa. This type of clamping apparatus is beneficial in a number of applications.

For example, a power tool, such as an oscillating tool, may utilize this type of clamping apparatus to attach an accessory thereto while in a clamped state and detach this same accessory therefrom while in an unclamped state. By using this type of clamping apparatus, the oscillating tool is configured to quickly switch to a different accessory, such as a cutting tool, a sanding tool, or any suitable tool, by simply moving the spring-actuated lever.

However, upon transitioning, the spring-actuated lever is configured to return to a position (e.g., position associated with the clamped state) with a substantial amount of force at least due to the spring. In addition, the spring-actuated lever may do so relatively quickly. In this regard, when a user is operating the spring-actuated lever, there is a possibility that the fast and forceful return of the spring-actuated lever may present a safety hazard for the user's fingers or whatever happens to be in the path of the spring-actuated lever.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a clamping apparatus with a control mechanism includes a cam, a cam post, a handle, and a handle plate. The cam is configured to rotate into a clamped position in which the clamping apparatus is in a clamped state and an unclamped position in which the clamping apparatus is in an unclamped state. The cam post is rotatable with the cam. The handle is movable into a first position and a second position. The handle plate is rotatable with the handle. The handle plate is configured to rotate the cam post in a first direction when the handle moves from the first position to the second position. The handle plate is configured to rotate independently of the cam post in a second direction for a predetermined distance when the handle moves from the second position to the first position. The first direction is opposite to the second direction.

In an example embodiment, a power tool includes a clamping apparatus with a control mechanism. The clamping apparatus includes at least (a) a cam configured to rotate into a clamped position in which the clamping apparatus is in a clamped state and an unclamped position in which the clamping apparatus is in an unclamped state and (b) a handle movable into a first position and a second position. The control mechanism includes (a) a cam post rotatable with the cam, and (b) a handle plate rotatable with the handle. The handle plate is configured to rotate the cam post in a first direction when the handle moves from the first position to the second position. The handle plate is configured to rotate independently of the cam post in a second direction for a predetermined distance when the handle moves from the second position to the first position. The first direction is opposite to the second direction.

In an example embodiment, a control mechanism includes (a) a cam post configured to rotate with a cam of a clamping apparatus, and (b) a plate configured to move with a lever of the clamping apparatus. The plate is configured to (i) rotate the cam post in a first direction when the lever moves from a first position to a second position and (ii) rotate in a second direction independently of the cam post in a second direction for a predetermined distance when the lever moves from the second position to the first position. The first direction is opposite to the second direction.

These and other features, aspects, and advantages of this disclosure are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
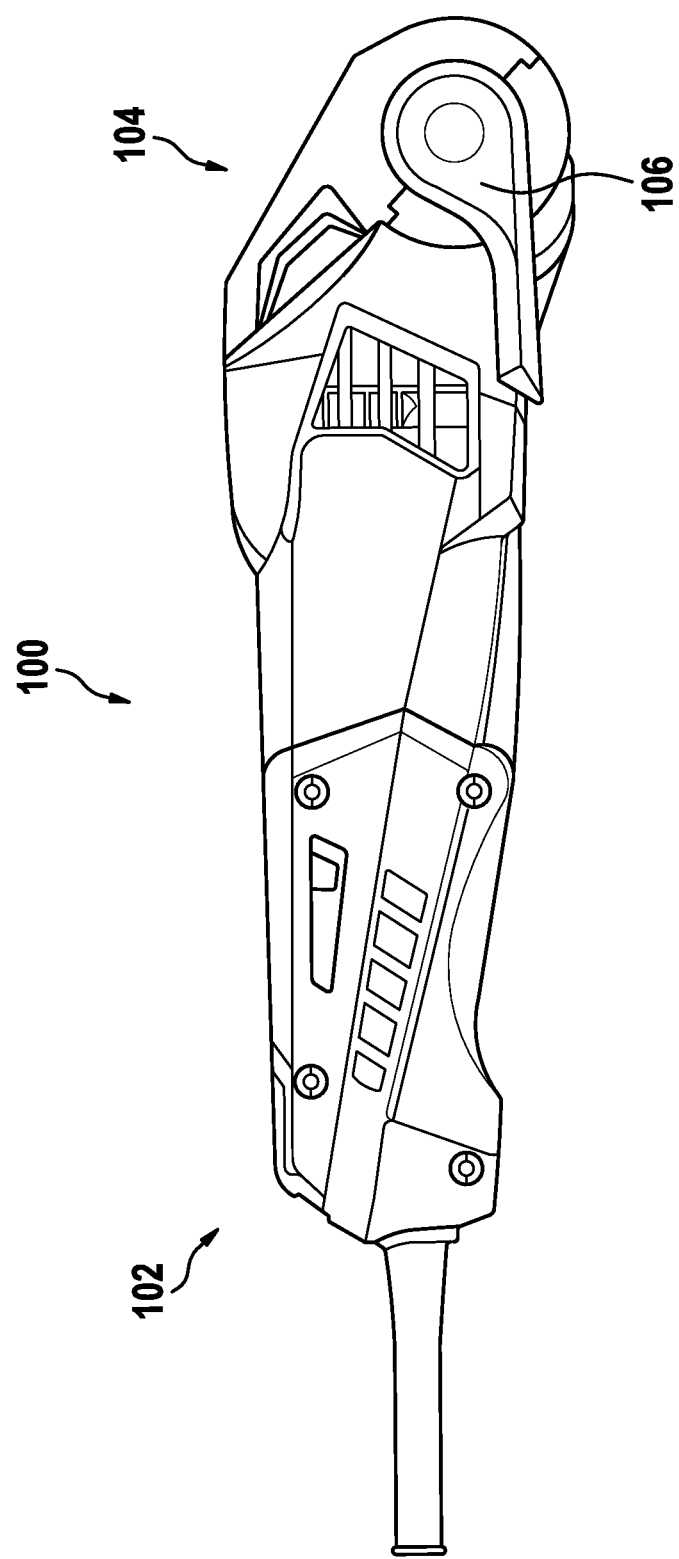
FIG. 1 is a side view of a power tool according to an example embodiment of this disclosure.
Figure 2:
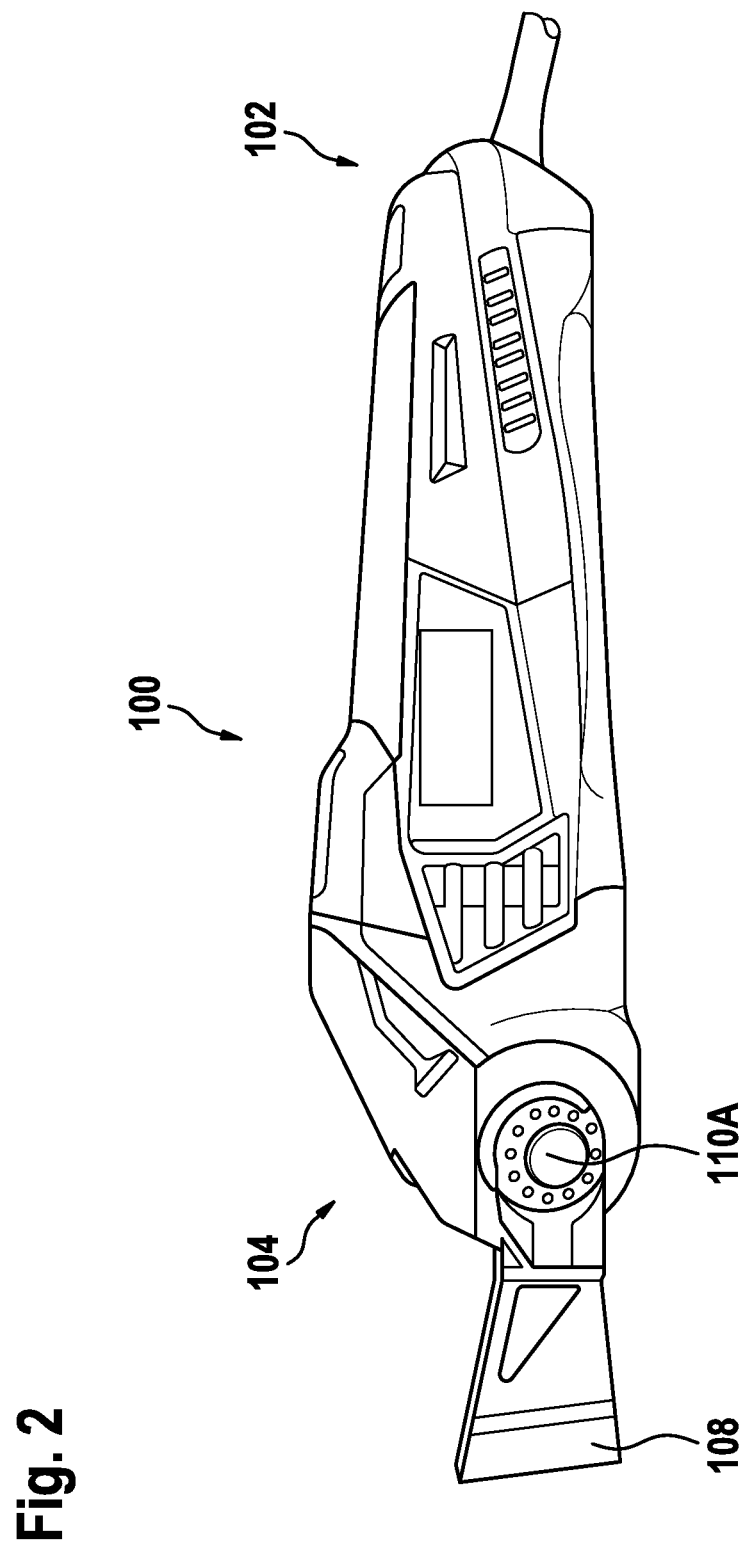
FIG. 2 is another side view of the power tool of FIG. 1 according to an example embodiment of this disclosure.
Figure 3:
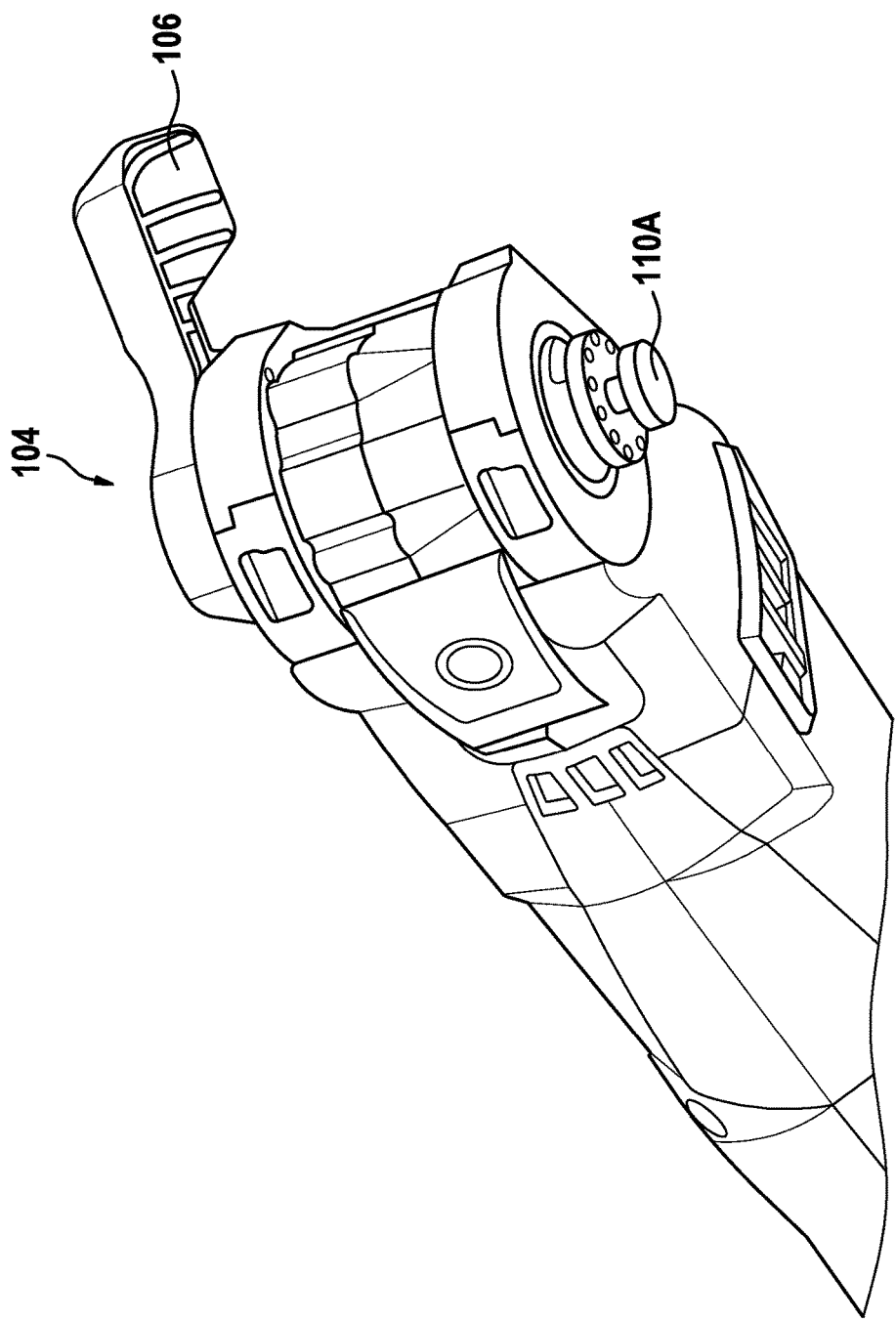
FIG. 3 is a perspective view of a power tool with a clamping apparatus according to an example embodiment of this disclosure.

FIGS. 1-3 illustrate a power tool according to an example embodiment. As shown in FIGS. 1-3, the power tool is an oscillating tool 100, which is configured to oscillate an accessory 108. In an example embodiment, the accessory 108 is configured to be attached and detached from the oscillating tool 100 by moving a lever, such as handle 106. For example, when the handle 106 is in a first position, the oscillating tool 100 is configured to hold and oscillate the accessory 108 when energized during normal operation. Furthermore, when the handle 106 is in a second position, the oscillating tool 100 is configured to release its hold on the accessory 108 such that any accessory 108 may be inserted or removed from the oscillating tool 108. With these attachment and detachment features, the oscillating tool 100 is configured to quickly accommodate and switch to a different accessory 108. In this regard, for example, the accessory 108 is a cutting tool, a sanding tool, a scraping tool, or any suitable attachment.

In an example embodiment, the oscillating tool 100 includes at least a drive system at a first end portion 102 and a clamping apparatus at a second end portion 104. In an example embodiment, the drive system includes at least an electric motor and a transmission. The transmission is configured to convert rotational movement of the motor into oscillating movement. The oscillating tool 100 is configured to provide the oscillating movement to the accessory 108 when clamped by the clamping apparatus. More specifically, in an example embodiment, the oscillating tool 100 is configured to oscillate at an angle of about 5 degrees or any suitable angle depending on the application.

Figure 4A:
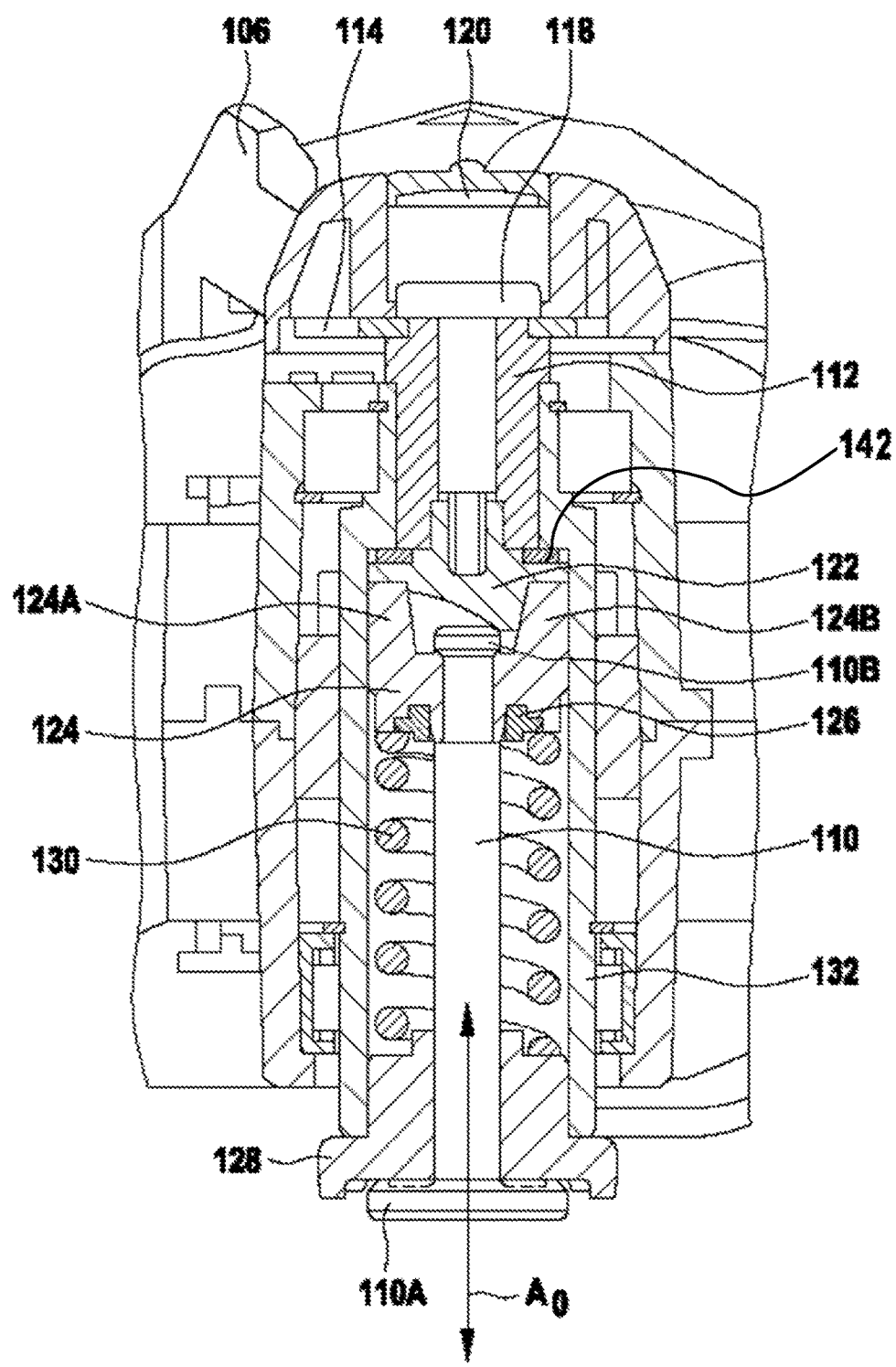
FIG. 4A is a view of a clamping apparatus in a clamped state according to an example embodiment of this disclosure.
Figure 4B:
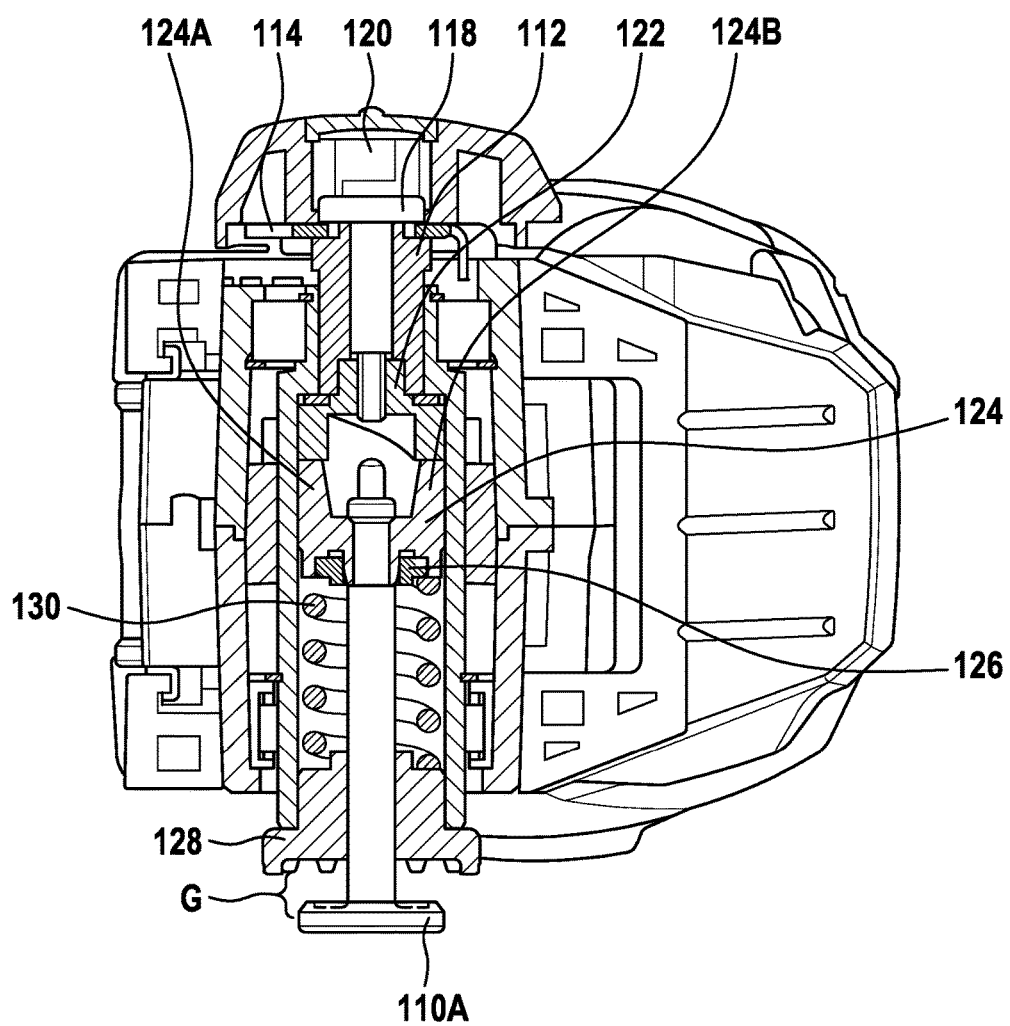
FIG. 4B is a view of the clamping apparatus of FIG. 4A in an unclamped state according to an example embodiment of this disclosure.

FIGS. 4A and 4B illustrate the oscillating tool 100 in a clamped state (e.g., locked state) and an unclamped state (e.g., unlocked state), respectively. In the clamped state, the clamping apparatus is locked such that any accessory 108 may be held by a clamping force. In the unclamped state, the clamping apparatus is unlocked such that the clamping force is released and any accessory 108 held by the clamping apparatus is released. To provide these states, in an example embodiment, the oscillating tool 100 includes a clamping apparatus, which includes at least a spool 132, a first clamping member 110A, a second clamping member 128, a spindle 110, a spring 130, a cam follower 124, a cam 122, and a lever (e.g. handle 106). Also, in an example embodiment, the clamping apparatus includes at least one mechanical fastener (e.g., bolt 118, washer 142, etc.) In an example embodiment, the spool 132 includes a cavity in which a cam 122, a cam follower 124, a spring 130, a second clamping member 128, and a spindle 110 are at least partially positioned. The spool 132 is configured to oscillate about an axis of oscillation Ao when the motor is energized. For example, the spool 132 is configured to rotate back and forth at approximately 5 degrees of rotation or any suitable angle of rotation.

In an example embodiment, the clamping apparatus includes the first clamping member 110A, which is fixedly connected or integral with a lower portion of the spindle 110. Also, in an example embodiment, the clamping apparatus includes the second clamping member 128. When in the clamped state, the clamping apparatus is configured to hold any accessory 108 between the first clamping member 110A and the second clamping member 128, as shown in FIG. 2. Alternatively, when in the unclamped state, the clamping apparatus is configured to release its hold on any accessory 108 that is between the first clamping member 110A and the second clamping member 128, as shown in FIG. 3. For example, in the unclamped state, the first clamping member 110A is pushed downwards and away from the second clamping member 128 such that there is a gap G (FIG. 4B) between the first clamping member 110A and the second clamping member 128, thereby enabling any accessory 108 to be inserted or removed from between the first clamping member 110A and the second clamping member 128.

In an example embodiment, the clamping apparatus includes the spindle 110. As shown in FIGS. 4A and 4B, in an example embodiment, the first clamping member 110A and the stopper 110B are positioned at opposite end portions of the spindle 110. Also, as previously mentioned, the first clamping member 110A and the second clamping member 128 are configured to clamp together when in a clamped state. This clamping feature enables the oscillating tool 100 to securely hold and/or oscillate any accessory 108, which is positioned between the first clamping member 110A and the second clamping member 128. In an example embodiment, the stopper 110B is configured to ensure that the cam follower 124 does not move beyond or separate from the spindle 110.

In an example embodiment, the spindle 110 extends through the cavity of the spool 132. Also, as illustrated in FIGS. 4A and 4B, the spindle 110 extends through at least the second clamping member 128, the spring 130, and the cam follower 124. In this regard, the second clamping member 128, the spring 130, and the cam follower 124 are centered or substantially centered about a shaft of the spindle 110. In an example embodiment, the spindle 110 and the first clamping member 110A are moveable along the axis of oscillation Ao or along another axis that is parallel to the axis of oscillation Ao.

In an example embodiment, the clamping apparatus includes the spring 130. The spring 130 is a compression spring, a conical spring washer (or coned-disc spring), or any suitable mechanical device. In FIGS. 4A and 4B, the spring 130 is a compression spring positioned in the cavity of the spool 132 between the second clamping member 128 and the cam follower 124. The spring 130 is configured to bias at least the cam follower 124 and the spindle 110 toward the cam 122 in accordance with rotational positions of the cam 122. In this regard, when the accessory 108 is received by the clamping apparatus and the handle 106 transitions to the first position, the spring 130 is configured to bias the first clamping member 110A against the accessory 108 such that the accessory 108 is clamped between the first clamping member 110A and the second clamping member 128.

In an example embodiment, the clamping apparatus includes a cam follower 124, which is positioned between the spring 130 and the cam 122. The cam follower 124 is connected to an upper end portion of the spindle 110 and opposite to the first clamping member 110A. The cam follower 124 is configured to be biased by the spring 130 such that the cam follower 124 interacts with the cam 122. In an example embodiment, the cam follower 124 includes a first protruding member 124A and a second protruding member 124B. The first protruding member 124A and the second protruding member 124B are positioned at opposite sides of the cam follower 124. In this regard, for example, the cam follower 124 comprises a generally circular shape with the first and second protruding members 124A and 124B at diametrically opposite sides from each other or positioned at 180 degrees from each other. As shown in FIGS. 4A and 4B, each of the first and second protruding members 124A and 124B extend beyond a surface of the spindle 110 to engage with the cam 122.

In an example embodiment, the cam follower 124 is a unitary member or monolithic structure. In another example embodiment, the cam follower 124 comprises two separate members, which are held together as a single unit by a washer 126, as shown in FIGS. 4A and 4B. In this regard, lower portions of each of the two members of the cam follower 124 are configured to mate with an upper portion of the washer 126. In an example embodiment, the washer 126 is positioned between the spring 130 and the cam follower 124. In this manner, the washer 126 supports the cam follower 124 such that the first and second protruding members 124A and 124B are configured to interact with the cam 122. In each of these example embodiments, the cam follower 124 comprises a rigid material, such as a metal material that includes at least one metal. As a non-limiting example, the cam follower 124 comprises hardened steel or heat-treated steel, thereby enabling the cam follower 124 to effectively engage with the cam 122.

Figure 5A:
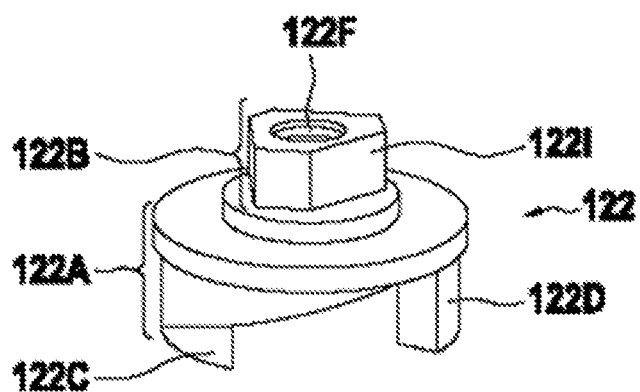
FIG. 5A is a side view of a cam according to an example embodiment of this disclosure.
Figure 5B:
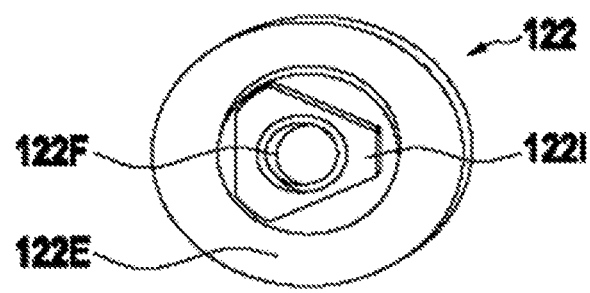
FIG. 5B is a top view of the cam of FIG. 5A according to an example embodiment of this disclosure.
Figure 5C:
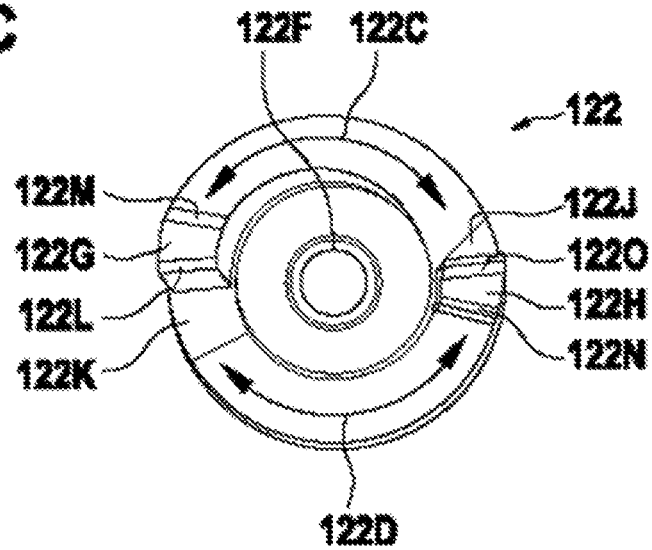
FIG. 5C is a bottom view of the cam of FIG. 5A according to an example embodiment of this disclosure.

FIGS. 5A-5C illustrate different views of the cam 122 according to an example embodiment. More specifically, FIG. 5A illustrates a side view of the cam 122, FIG. 5B illustrates a top plan view of the cam 122, and FIG. 5C illustrates a bottom plan view of the cam 122. In an example embodiment, the cam 122 includes a first end portion 122A, which is configured to interact with the cam follower 124, and a second end portion 122B, which is configured to connect to the cam post 112. In this regard, the cam 122 comprises a rigid material, such as a metal material, a plastic material, or any suitable material that is able to provide the functionality disclosed herein. As a non-limiting example, the cam 122 comprises hardened steel or heat-treated steel.

As discussed above, in an example embodiment, at the first end portion 122A, the cam 122 is configured to engage with the cam follower 124. In this regard, for example, the cam 122 includes a generally circular periphery at the first end portion 122A. In addition, the first end portion 122A includes a first inclined surface 122C and a second inclined surface 122D. The first inclined surface 122C of the cam 122 is configured to interact with the first protruding member 124A of the cam follower 124. The second inclined surface 122D of the cam 122 is configured to interact with the second protruding member 124B of the cam follower 124.

In an example embodiment, the cam 122 further includes a first detent 122G and a second detent 122H. The first detent 122G and the second detent 122H are positioned at the higher parts of the first inclined surface 122C and the second inclined surface 122D, respectively. The first detent 122G and the second detent 122H are structured to receive a corresponding one of the first and second protruding members 124A and 124B when the cam 122 is rotated to the unclamped position, as shown in FIG. 4B. In an example embodiment, the first detent 122G and the second detent 122H are configured to hold and maintain the position of the cam 122 in the unclamped position.

In an example embodiment, the cam 122 is configured to rotate in a manner such that the first protruding member 124A and the second protruding member 124B of the cam follower 124 are released from the first detent 122G and the second detent 122H, respectively. More specifically, when the first protruding member 124A and the second protruding member 124B are released from the first detent and 122G the second detent 122H, respectively, the cam 122 rotates relative to the cam follower 124 such that the lower parts 122J and 122K transition towards the first and second protruding members 124A and 124B. This relative movement between the cam 122 and the cam follower 124 transitions the clamping apparatus from the unclamped position to the clamped position.

In an example embodiment, when the cam 122 is in the clamped position (FIG. 4A), the first and second protruding members 124A and 124B of the cam follower 124 are positioned at the lower parts 122J and 122K (FIG. 5C) of the inclined surfaces 122C and 122D. As such, the cam 122 and cam follower 124 occupy a lesser amount of space within the spool 132 and cause the spring 130 to be in a less compressed state in the clamped position (FIG. 4A) than in the unclamped position (FIG. 4B). Accordingly, the first clamping member 110A and the second clamping member 128 are configured to clamp together and hold an accessory 108.

In an example embodiment, when the cam 122 is in the unclamped position (FIG. 4B), the first and second protruding members 124A and 124B of the cam follower 124 are positioned within the detents 122G and 122H of the cam 122. In an example embodiment, the detents 122G and 122H are positioned at the higher parts of the inclined surfaces 122C and 122D (FIG. 5C) such that the cam 122 and cam follower 124 occupy a greater amount of space within the spool 132 and cause the spring 130 to be in a more compressed state in the unclamped position (FIG. 4B) than in the clamped position (FIG. 4A). Moreover, as shown in FIG. 4B, the spindle 110 is pushed downward such that there is a gap G between the first clamping member 110A and the second clamping member 128. The separation of the first clamping member 110A and the second clamping member 128 enables an accessory 108 to be inserted or removed from the clamping apparatus.

In an example embodiment, the cam 122 includes one or more of the ribs 122L, 122M, 122N, and 122O. For example, in one embodiment (not shown), the cam 122 includes the ribs 122M and 122N and not the ribs 122L and 122O, or vice versa. In another example embodiment, as shown in FIG. 5C, the cam 122 includes ribs 122L, 122M, 122N, and 122O. More specifically, in the embodiment shown in FIG. 5C, the cam 122 is structured such that each of the ribs 122L and 122M protrudes from the first inclined surface 122C. Also, as shown in FIG. 5C, the cam 122 is structured such that each of the ribs 122N and 122O protrudes from the second inclined surface 122D.

More specifically, as shown in FIG. 5C, the first detent 122G is between the ribs 122L and 122M along the first inclined surface 122C and the second detent 122H is between the ribs 122N and 122O along the second inclined surface 122D. In this regard, each of the ribs 122L and 122M is structured such that the first protruding member 124A of the cam follower 124 is able to maintain its hold of the cam 122 at the higher part of the inclined surface 122C such that the clamping apparatus is held in the unclamped state. Meanwhile, each of the ribs 122N and 122O is structured such that the second protruding member 124B of the cam follower 124 is able to maintain its hold of the cam 122 at the higher part of the inclined surface 122D such that the clamping apparatus is held in the unclamped state. Also, due to this structural configuration, when the cam 122 rotates such that the first and second protruding members 124A and 124B engage with the ribs 122M and 122N, the handle 106 is able to receive tactile feedback in a manner that enables, for example, the user know that the handle 106 is in the second position and the clamping apparatus has been set into the unclamped state.

In an example embodiment, at the second end portion 122B, the cam 122 is configured to mate with a cam post 112. In an example embodiment, the cam 122 includes a cam post connection member 122I. The cam post connection member 122I is configured to mate with a receiving member of the cam post 112. In an alternative embodiment, the mating structures of the cam 122 and the cam post 112 are reversed such that the cam post 112 includes a connection member and the cam 122 includes a receiving member.

In an example embodiment, the cam 122 includes the cam post connection member 122I with a polygonal shaped cross section in plan view, as shown in FIG. 5B. In this regard, the polygonal shape may comprise any number of sides. Advantageously, the sides of the cam post connection member 122I provide abutment surfaces for the cam post 112. As a non-limiting example, the cam post connection member 122I includes a hexagonal shaped cross section in plan view. In this regard, as shown in FIG. 5B, the cross-section of the cam post connection member 122I comprises an irregular hexagonal shape, thereby enabling proper alignment of the cam post 112 (particularly the first protrusion 112H and the second protrusion 112I) on the cam 122 in relation to at least one other component (e.g., the cam follower 124, the handle plate 114, the gear box cover 134, or the like) of the clamping apparatus. In this regard, the cam post connection member 122I of the cam 122 is configured to connect to the cam post 112 such that (i) a rotation of the cam post 112 is configured to lead to a rotation of the cam 122, and (ii) a rotation of the cam 122 is configured to lead to a rotation of the cam post 112.

In an example embodiment, the cam 122 includes a through-hole 122F. In this regard, for example, the through-hole 122F is defined within the cam 122 and configured to receive a mechanical fastener. In this example, the mechanical fastener is a bolt 118. However, a reference to a mechanical fastener in this disclosure may refer to any suitable hardware device that joins, affixes, or assists in the joining of at least two components to each other and provides the necessary and appropriate function disclosed herein.

Also, in an example embodiment, interior surfaces of the cam 122 that define the through-hole 122F and engage with the mechanical fastener are threaded. In an example embodiment, the bolt 118 connects the cam 122 to the handle 106, the handle plate 114, and the cam post 112. The connection of these components enables at least a rotation of the handle 106 to cause a rotation of the cam 122 relative to the cam follower 124.

Figure 6:
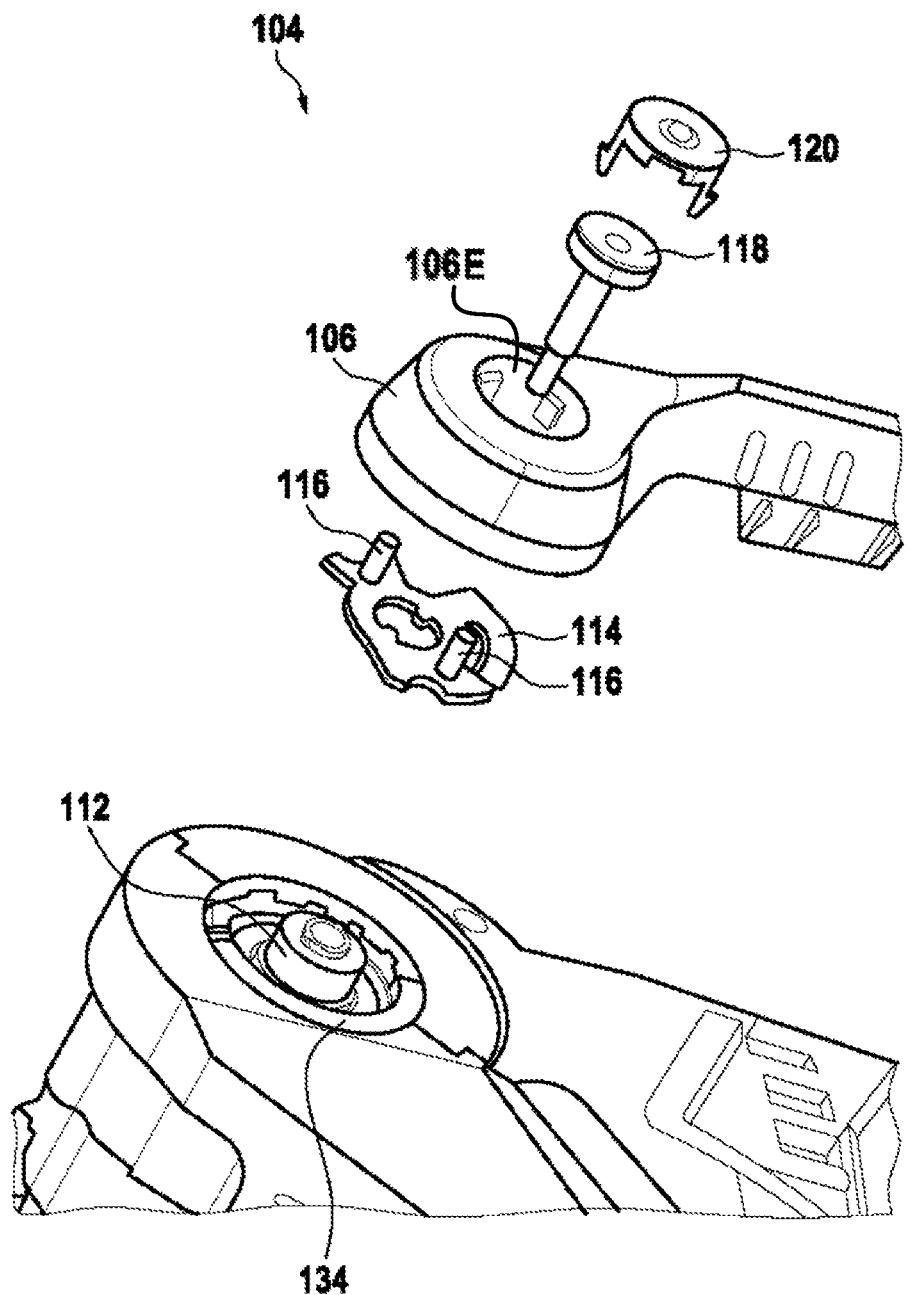
FIG. 6 is an exploded view of a control mechanism along with a lever according to an example embodiment of this disclosure.

FIG. 6 is an exploded view of a control mechanism along with a lever according to an example embodiment. In an example embodiment, the control mechanism is configured to enable the spring-actuated lever, such as the handle 106, to be controlled when the spring 130 transitions from a more compressed state, as shown in FIG. 4B, to a less compressed state, as shown in FIG. 4A. In addition, the control mechanism is configured to enable a movement of the spring-actuated lever, such as the handle 106, to be controlled as the cam 122 rotates relative to the cam follower 124. In an example embodiment, the control mechanism includes at least the cam post 112 and the handle plate 114.

In an alternative example embodiment, the control mechanism is integrated with the clamping apparatus itself. More specifically, in this regard, for example, the clamping apparatus includes a unit in which the cam post 112 is integral with the cam 122 and/or another unit in which the handle plate 114 is integral with the lever (e.g. handle 106). In effect, with this alternative structure, the clamping apparatus is configured to provide the same advantages as that shown in FIG. 6, but with less distinct parts.

FIGS. 7A-7D illustrate the cam post 112 according to an example embodiment. In an example embodiment, the cam post 112 is positioned between the cam 122 and the handle plate 114. More specifically, the cam post 112 is connected to the cam 122 at a first end portion. In addition, the cam post 112 is configured to interact with the handle plate 114 at a second end portion. In this regard, the cam post 112 comprises a rigid material, such as a metal material comprising at least one metal. As a non-limiting example, the cam post 112 comprises steel, which advantageously provides relatively high tensile strength at a relatively low cost. More specifically, in an example embodiment, the cam post 112 comprises hardened steel or heat-treated steel.

In an example embodiment, as shown in FIGS. 7A-7D, the cam post 112 is a cylindrical structure with a first cylindrical portion 112A, a second cylindrical portion 112B, and a third cylindrical portion 112C. In an example embodiment, the first cylindrical portion 112A, the second cylindrical portion 112B, and the third cylindrical portion 112C comprise a monolithic structure. In another example embodiment, the cam post 112 includes a plurality of structures that are connected or joined together. The center axes, taken along the longitudinal direction, of the first cylindrical portion 112A, the second cylindrical portion 112B, and the third cylindrical portion 112C are aligned with each other. In addition, the cam post 112 includes an opening 112F within the first cylindrical portion 112A, the second cylindrical portion 112B, and the third cylindrical portion 112C. With this opening 112F, the cam post 112 is configured to receive a mechanical fastener, such as the bolt 118, which connects the cam post 112 to the handle 106, the handle plate 114, and the cam 122. In an example embodiment, as shown in FIGS. 4A-4B and 6, a bolt cover 120 is configured to cover the bolt 118.

In an example embodiment, the first cylindrical portion 112A includes a surface 112D and a cam connection portion 112E. The cam connection portion 112E includes a mechanical structure that enables the cam post 112 to mate with at least a second end portion 122B of the cam 122. In an example embodiment, the cam connection portion 112E includes a cam receiving portion, which is defined as an opening within the first cylindrical portion 112A. As shown, in this example, the opening has a hexagonal cross-section in plan view to order to mate with the cam post connection member 122I, which has a hexagonal cross-section in plan view. These features enable a rotation of the cam post 112 to bring about a rotation of the cam 122 by having the sides of the cam post 112 abut against corresponding sides of the cam 122. In addition, these features enable a rotation of the cam 122 to bring about a rotation of the cam post 112 by having the sides of the cam 122 abut against corresponding sides of the cam post 112.

Figure 7A:
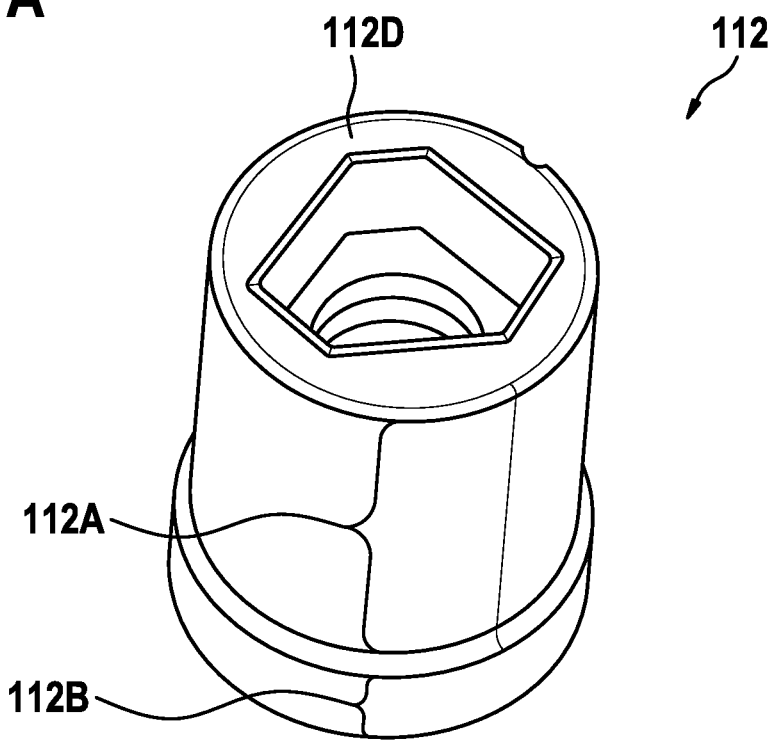
FIG. 7A is a perspective view of a first side of a cam post according to an example embodiment of this disclosure.
Figure 7B:
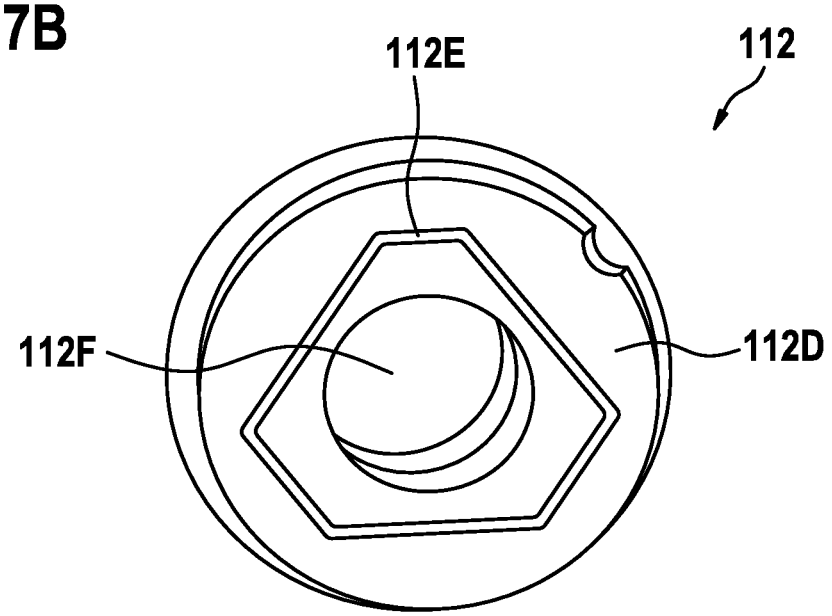
FIG. 7B is a plan view of the cam post of FIG. 7A according to an example embodiment of this disclosure.
Figure 7C:
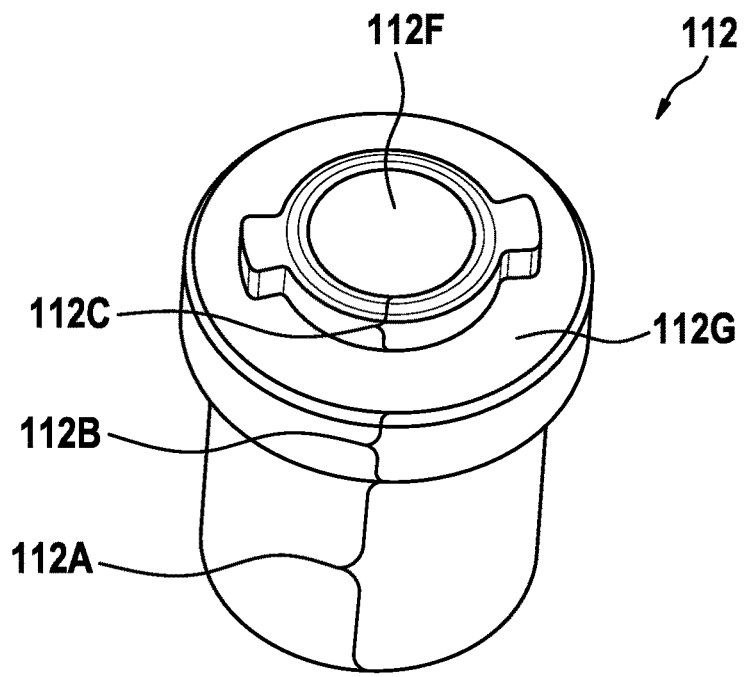
FIG. 7C is a perspective view of a second side of the cam post of FIG. 7A according to an example embodiment of this disclosure.
Figure 7D:
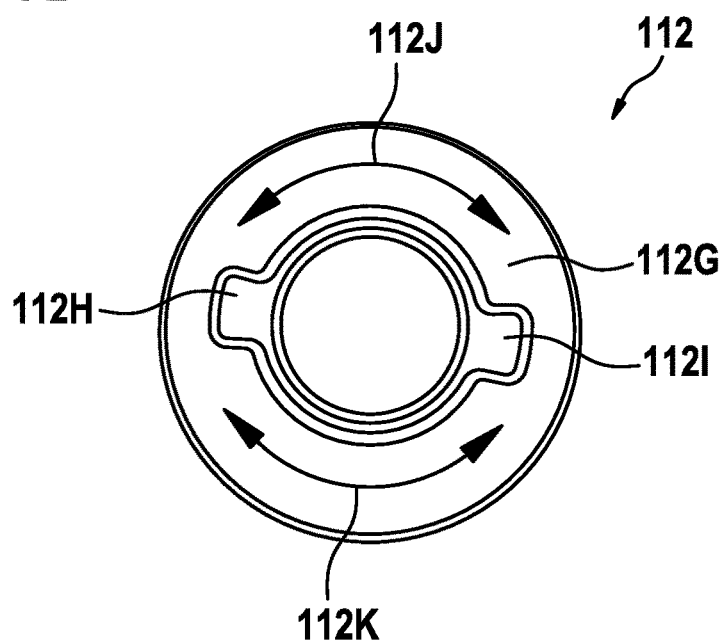
FIG. 7D is a plan view of the cam post of FIG. 7C according to an example embodiment of this disclosure.

In an example embodiment, the cam post 112 includes a second cylindrical portion 112B. In an example embodiment, an outer diameter of the second cylindrical portion 112B is larger than an outer diameter of the first cylindrical portion 112A. In an example embodiment, an outer diameter of the second cylindrical portion 112B is larger than an outer diameter of the third cylindrical portion 112C. In this regard, the sizing of the second cylindrical portion 112B is such that an outer surface of the second cylindrical portion 112B extends out further in a radial direction than that of the first cylindrical portion 112A and the third cylindrical portion 112C, respectively. The extension of the second cylindrical portion 112B is configured to provide at least a supporting surface 112G for the handle plate 114. As shown in FIGS. 7C-7D, the supporting surface 112G is an upper surface of the second cylindrical portion 112B, which extends outward and away from an outer surface of the first cylindrical portion 112A. With this configuration, at least a portion of the handle plate 114 is disposed and supported on the second cylindrical portion 112B.

In an example embodiment, the cam post 112 includes a third cylindrical portion 112C. As shown in FIG. 7C, the third cylindrical portion 112C comprises an upper portion of the cam post 112. In an example embodiment, the third cylindrical portion 112C of the cam post 112 is configured to interact with the handle plate 114. In an example embodiment, a height or thickness of the third cylindrical portion 112C is greater than a thickness of the handle plate 114 such that the mechanical fastener, such as the bolt 118, does not interfere with the interaction of the cam post 112 and the handle plate 114. In this regard, the third cylindrical portion 112C is provided with a height such that there is a suitable amount of clearance between the mechanical fastener (e.g., the bolt 118) and the handle plate 114. This clearance enables the handle plate 114 to move relative to the cam post 112.

In an example embodiment, the third cylindrical portion 112C includes a first protrusion 112H and a second protrusion 112I, which extend outward and away from an outer surface of the third cylindrical portion 112C. In an example embodiment, each of the first and second protrusions 112H, 112I are fixed or integral with the third cylindrical portion 112C. As shown in FIGS. 7C-7D, the first protrusion 112H extends in a radial direction, but not more than that of the supporting surface 112G of the second cylindrical portion 112B. Also, in FIGS. 7C-7D, the second protrusion 112I extends in a radial direction, but not more than that of the supporting surface 112G of the second cylindrical portion 112B. In this regard, the third cylindrical portion 112C including its first and second protrusions 112H, 112I have radial dimensions, which are each less than that of the second cylindrical portion 112B. With this structural configuration, the supporting surface 112G is configured to provide at least some support to the handle plate 114 at least along a peripheral portion of the supporting surface 112G.

As shown in FIGS. 7C-7D, each of the first and second protrusions 112H and 112I extend radially from a center point of the cam post 112. In an example embodiment, each of the first and second protrusions 112H and 112I include a rectangular or substantially rectangular shape, as shown in FIGS. 7C and 7D, or any suitable shape that is configured to provide the appropriate interaction with first and second tabs 114F and 114G of the handle plate 114. In addition, each of the first and second protrusions 112H and 112I are sized appropriately such that each is able to (i) engage with the first and second tabs 114F and 114G of the handle plate 114 while rotating in a first direction and (ii) provide sufficient sized first and second spaces 112J and 112K therebetween such that the handle plate 114 and the handle 106 can rotate, for example, in a second direction without also causing the cam post 112 to rotate.

Also, in an example embodiment, the first protrusion 112H and the second protrusion 112I are positioned opposite from each other along the circular periphery of the third cylindrical portion 112C. The first protrusion 112H is positioned at or around 180 degrees from the second protrusion 112I. In this regard, the first and second protrusions 112H, 112I are configured to interact with the first and second tabs 114F and 114G of the handle plate 114. In an example embodiment, the first and second protrusions 112H and 112I are structured to interact with the handle plate 114 such that a movement of the handle 106 is able to be controlled in a safe and reliable manner without kick-back, for example, when (i) the spring 130 moves from a more compressed state to a less compressed state, and/or (ii) a relative movement between the cam 122 and the cam follower 124 causes the lower parts 122J and 122K to move towards the first and second protruding members 124A and 124B.

Figure 8A:
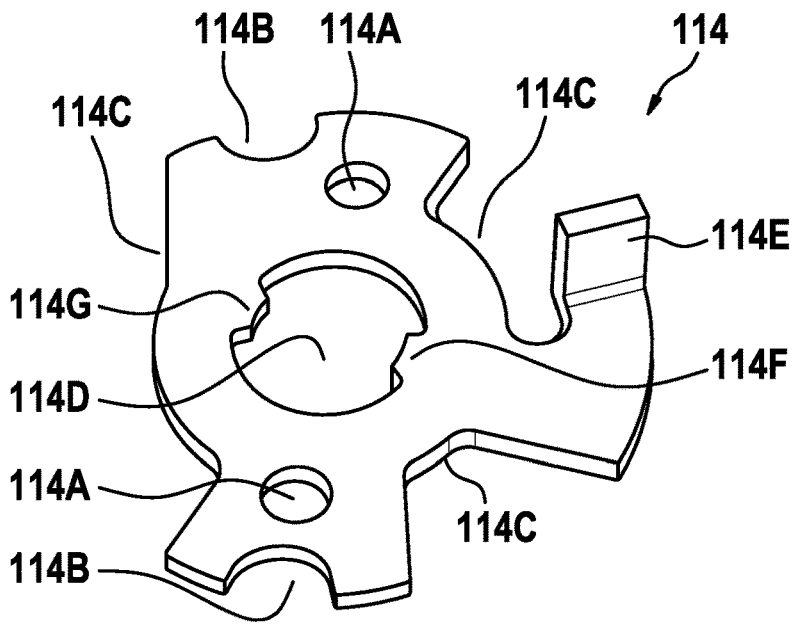
FIG. 8A is a view of a first side of a handle plate according to an example embodiment of this disclosure.
Figure 8B:
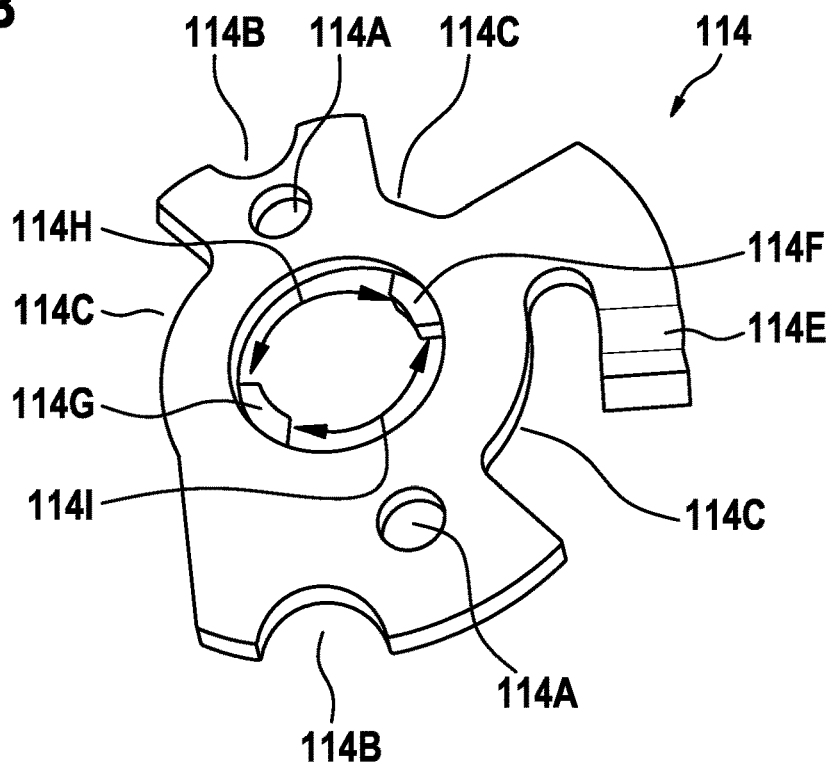
FIG. 8B is a view of a second side of the handle plate of FIG. 8A according to an example embodiment of this disclosure.

FIGS. 8A-8B illustrate the handle plate 114 according to an example embodiment. More specifically, as discussed above, the handle plate 114 is configured to interact with the cam post 112 to provide a control mechanism for the clamping apparatus. The handle plate 114 therefore comprises a rigid material, such as a metal material, a plastic material, or any suitable material that is able to provide the functionality disclosed herein. More specifically, in an example embodiment, the handle plate 114 is a stamped sheet of metal material comprising at least one metal. As a non-limiting example, the handle plate 114 comprises steel, which advantageously provides relatively high tensile strength at a relatively low cost. In an example embodiment, the handle plate 114 comprises hardened steel or heat-treated steel.

Figure 9:
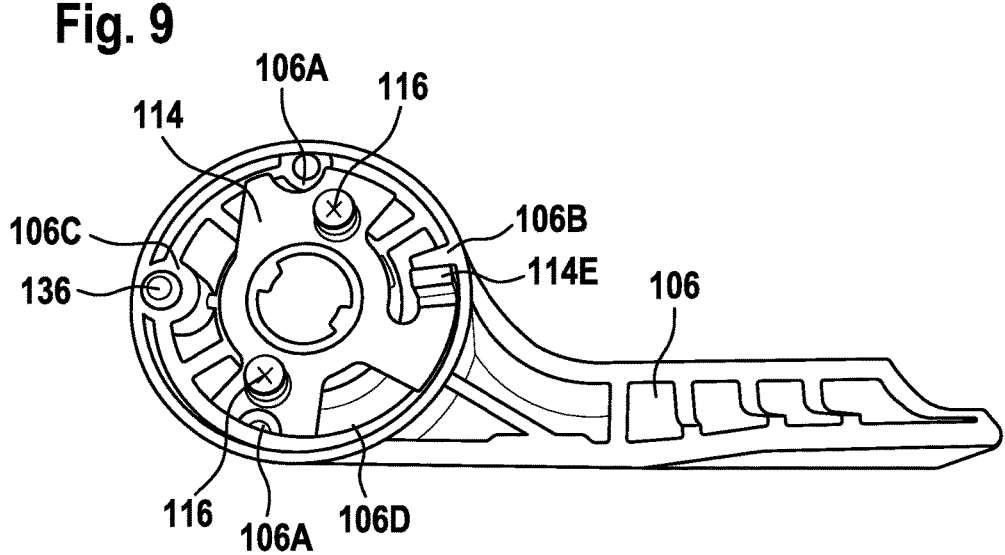
FIG. 9 is a view of a handle and a handle plate according to an example embodiment of this disclosure.

In an example embodiment, the handle plate 114 comprises any suitable shape that enables the handle plate 114 to be received within at least a portion of the handle 106 (e.g., FIG. 9) while also providing the functionality discussed herein. Further, as discussed above, the handle plate 114 has a thickness, which is less than a thickness (or height) of the third cylindrical portion 112C such that there is an appropriate clearance between the bolt 118 and the handle plate 114. In addition, in an example embodiment, the handle plate 114 has a thickness such that the handle plate 114 does not extend beyond a rear side of the handle 106 (with the exception of the stopper 114E that extends beyond a rear side of the handle 106) when the handle plate 114 is mounted to an internal/rear side of the handle 106 (FIG. 9).

In an example embodiment, the handle plate 114 comprises handle attachment portions. The handle attachment portions enable the handle plate 114 to connect to the handle 106. In an example embodiment, the handle attachment portions of the handle plate 114 include through-holes 114A, which are configured to receive mechanical fasteners, such as screws 116 (FIGS. 6 and 9), which connect the handle plate 114 to the handle 106.

In an example embodiment, the handle plate 114 includes an opening 114D. The opening 114D is configured to receive a mechanical fastener, such as the bolt 118. As shown in FIGS. 8A and 8B, in an example embodiment, the opening 114D has a radial dimension that is larger than that of the bolt 118. Also, the opening 114D is configured to receive the third cylindrical portion 112C, as well as the first and second protrusions 112H. In addition, the opening 114D is also structured such that the cam post 112 and the handle plate 114 are configured to rotate relative to each other. Also, as shown in FIG. 8B, the opening 114D includes a first clearance 114H and a second clearance 114I in the handle plate 114. By providing the first clearance 114H and the second clearance 114I, the mechanical structure of the handle plate 114 enables the cam post 112 to rotate therein without also forcing the handle plate 114 and the handle 106 to rotate therewith. Advantageously, the first and second clearances 114H and 114I enable the cam post 112 to rotate, for example, independently of the handle 106 to a certain extent, as a safety precaution.

In an example embodiment, the handle plate 114 includes handle plate holding portions 114B, which are configured to hold the handle plate 114 in proper position relative to the handle 106. For example, the handle plate 114 includes a first handle holding portion 114B and a second handle holding portion 114B. In this regard, for example, the first and second handle holding portions 114B are configured to engage with projecting portions 106A of the handle 106 such that the handle plate 114 and the handle 106 are in proper position, as shown in FIG. 9. When engaged with each other, the first and second handle holding portions 114B and the projecting portions 106A abut against each other and prevent each other from moving. The handle holding portions 114B are positioned at suitable portions of the handle plate 114. The handle holding portions 114B are configured to be any suitable shape so long as they provide the functionality discussed herein.

In an example embodiment, the handle plate 114 includes a first tab 114F and a second tab 114G. As shown in FIGS. 8A and 8B, the first tab 114F and the second tab 114G are spaced from each other. In an example embodiment, the first tab 114F is positioned at 180 degrees from the second tab 114G. With this configuration, the first and second tabs 114F and 114G of the handle plate 114 are configured to interact with the first and second protrusions 112H and 112I of the cam post 112. More specifically, the first tab 114F is configured to abut against the second protrusion 112I while the second tab 114G abuts against the first protrusion 112H. In addition, the first tab 114F is configured to abut against the first protrusion 112H while the second tab 114G abuts against the second protrusion 112I.

In an example embodiment, the handle plate 114 includes a stopper 114E. The stopper 114E is configured to prevent a rotational motion of the handle plate 114 relative to the handle 106. For example, the stopper 114E is configured to abut against a surface of the stopper engagement portion 106B of the handle 106 (FIG. 9). As shown in the illustrated embodiment, the stopper 114E comprises a part of the handle plate 114 that extends in a manner, as shown in at least FIGS. 8A-8B, such that the stopper 114 is directed in a direction that is perpendicular or substantially perpendicular to the radial direction of the handle plate 114.

In an example embodiment, the handle plate 114 includes at least one cutaway portion 114C. Each cutaway portion 114C defines at least a shape and weight of the handle plate 114. As a non-limiting example, a cutaway portion 114C may correspond to a through-hole or a gap that is defined in the handle plate 114. In an example embodiment, each cutaway portion 114C comprises any suitable shape or size so long as that cutaway portion 114C does not interfere with functional features of the handle plate 114. Advantageously, each cutaway portion 114C is configured to lessen the weight, size, amount of material, and cost of the handle plate 114.

FIG. 9 illustrates the handle plate 114 together with the handle 106 according to an example embodiment. In an example embodiment, as shown in FIGS. 4A and 4B, the handle 106 is configured as a spring-actuated lever for the clamping apparatus. In an example embodiment, the handle 106 comprises any suitable material with sufficient rigidity, such as a plastic material or a metal material. In the example embodiment of FIG. 9, the handle 106 includes a nylon material.

In an example embodiment, the handle 106 is connected to the cam 122 such that rotation of the handle 106 results in rotation of the cam 122. In this regard, for example, the handle 106 includes a through-hole 106E (FIG. 6), which is configured to receive a mechanical fastener, which is also connected to the cam 122. In this example, the mechanical fastener is bolt 118.

In an example embodiment, on a rear side, the handle 106 includes a handle plate receiving portion. The handle plate receiving portion includes a peripheral wall 106D that is configured to surround an outer periphery of the handle plate 114 when the handle plate 114 is received within the handle plate receiving portion. In this regard, the handle plate 114 is positioned within the confines of the peripheral wall 106D of the handle 106.

Also, in an example embodiment, on the rear side, the handle 106 includes handle plate connection portions. The handle plate connection portions include receiving portions, such as recesses defined within the handle 106. The receiving portions are configured to receive mechanical fasteners that connect the handle plate 114 to the handle 106. For instance, in this case, the mechanical fasteners, which are received by handle 106, include screws 116 that securely attach the handle plate 114 to the handle 106.

In addition, in an example embodiment, the handle 106 includes projecting portions 106A. These projecting portions 106A extend from the rear side of the handle 106. A height (or thickness) of each of the projecting portions 106A is greater than a thickness of the handle plate 114. In this regard, the projecting portions 106A are configured to prevent a movement of the handle plate 114 relative to a movement of the handle 106. In addition, the projecting portions 106A advantageously prevent the mechanical fasteners, such as the screws 116, from bearing the full load associated with the rotational movement of the handle 106 and/or the clamping/unclamping action.

In an example embodiment, the handle 106 includes a stopper engagement portion 106B. The stopper engagement portion 106B is configured to prevent a movement of the stopper 114E of the handle plate 114 relative to the handle 106. More specifically, the stopper engagement portion 106B includes a projection that extends from a rear surface of the handle 106. In an example embodiment, the stopper engagement portion 106B does not extend beyond the stopper 114E of the handle plate 114. As shown, the stopper engagement portion 106B has a surface that is in support of or in contact with a surface of the stopper 114E of the handle plate 114.

Figure 10:
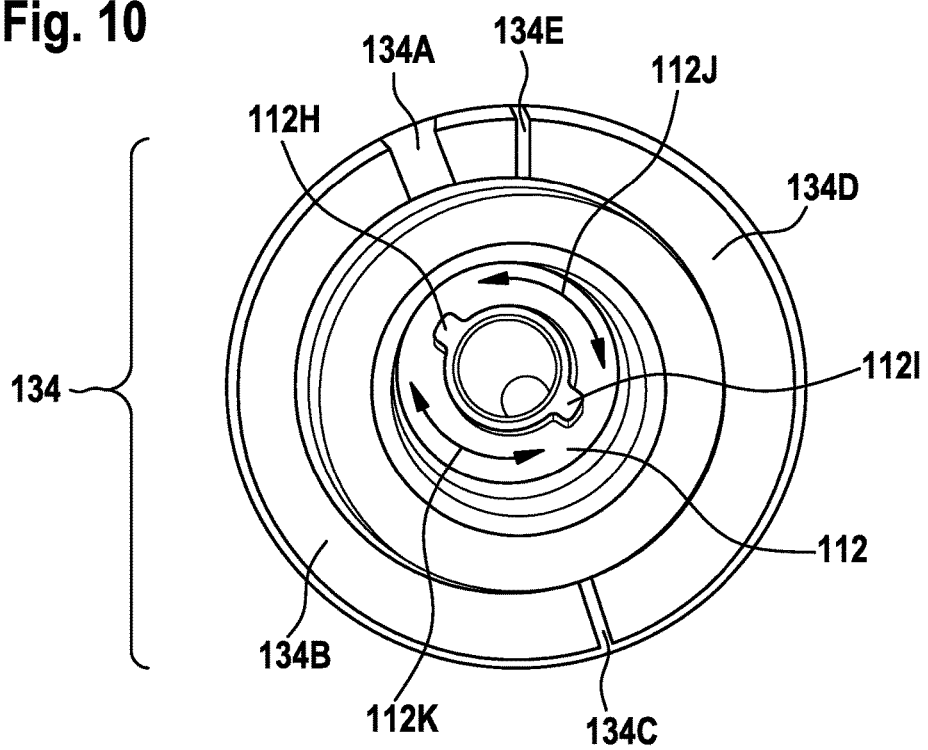
FIG. 10 is a view of a cam post within a gear box cover according to an example embodiment of this disclosure.

FIG. 10 illustrates an enlarged view of the cam post 112 and the gear box cover 134 of FIG. 6 according to an example embodiment. As shown, the cam post 112 is positioned within the gear box cover 134 at the second end portion 104 of the oscillating tool 100. In an example embodiment, the gear box cover 134 includes a portion, which is configured to provide guidance for a movement of the spring-actuated lever, such as the handle 106. In this regard, for example, the gear box cover 134 includes any suitable material that is able to provide the functionality disclosed herein. As a non-limiting example, the gear box cover 134 includes a metal material, such as aluminum. In an example embodiment, the gear box cover 134 comprises a groove 134A, a detent guiding path 134B, a backstop 134C for the clamped state, a stopper guiding path 134D, and a backstop 134E for the unclamped state.

In an example embodiment, the groove 134A is configured to receive a detent 136 (FIG. 9), which is disposed in a detent holder 106C of the handle 106. In an example embodiment, the detent 136 is a spring-loaded structure, which is compressible. When in the clamped state, the handle 106 is positioned such that the detent 136 is received and held by the groove 134A of the gear box cover 134. The groove 134A is configured to hold the detent 136 and the handle 106 in proper position when the clamping apparatus is in the clamped state. However, when the handle 106 transitions from the clamped state to another state (e.g., a transition state), the detent 136 compresses and moves out of the groove 134A and onto the detent guiding path 134B, which has a surface that is higher than that of the groove 134A. When the handle 106 is in the unclamped state, the detent 136 is positioned on the detent guiding path 134 near the backstop 134C.

In an example embodiment, the detent guiding path 134B provides a pathway for the detent 136 when the handle 106 is not in the clamped state (e.g., a transition state or the unclamped state). In an example embodiment, the detent guiding path 134B extends from the groove 134A to the backstop 134C. In an example embodiment, the detent guiding path 134B comprises a portion of the gear box cover 134 that is higher than the other portions of the gear box cover 134. As discussed above, when the handle 106 is not in the clamped position, the detent 136 is compressed such that the detent 136 is released from the groove 134A and travels along the detent guiding path 134B. The movement of the detent 136 along the detent guiding path 134B ensures that the handle 106 rotates with proper guidance.

In an example embodiment, the stopper guiding path 134D provides a pathway for the stopper 114E. In an example embodiment, the stopper guiding path 134D is defined by the backstop 134C at one end and the backstop 134E at the other end. When the handle 106 is moved from a clamped state to an unclamped state (or vice versa), the stopper 114E of the handle plate 114 is configured to travel along the stopper guiding path 134D of the gear box cover 134. The stopper guiding path 134 ensures that the handle 106 moves into the clamped position and the unclamped position, or vice versa with proper guidance.

In an example embodiment, the backstop 134C is positioned a predetermined distance away from the backstop 134E. In this regard, the predetermined distance is any suitable amount. For instance, in FIG. 10, the backstop 134C and the backstop 134E are positioned 150 degrees from each other along a circular periphery of the gear box cover 134. In this regard, the handle 106 is configured to rotate 150 degrees about its center axis to transition the clamping apparatus from the clamped state to the unclamped state, and vice versa.

In addition, in an example embodiment, the backstop 134C is configured to provide an abutment surface for the stopper 114E of the handle plate 114. When the clamping apparatus is in the clamped state, the stopper 114E of the handle plate 114 is in contact with the backstop 134C. In this regard, the backstop 134C is configured to prevent the stopper 114E (and hence the handle plate 114 and the handle 106) from further rotation in that direction (e.g., the clockwise direction) when in the clamped state.

Also, in an example embodiment, the backstop 134E is configured to provide an abutment surface for the stopper 114E of the handle plate 114. When the clamping apparatus is in the unclamped state, the stopper 114E of the handle plate 114 is in contact with the backstop 134E. In this regard, the backstop 134E is configured to prevent the stopper 114E (and hence the handle plate 114 and the handle 106) from further rotation in that direction (e.g., the counterclockwise direction) when in the unclamped state.

FIGS. 11A-16B illustrate the interactions of the handle 106, the handle plate 114, and the cam post 112 according to an example embodiment. In order to show these interactions, at least one feature (e.g., bolt 118) has been omitted from FIGS. 11A-16B, but can be included in an example embodiment. More specifically, FIGS. 11A-13B illustrate the interactions of the handle plate 114 and the cam post 112 when the handle 106 rotates in a first direction (or a counterclockwise direction 138) according to an example embodiment. Meanwhile, FIGS. 14A-16B illustrate the interactions of the handle plate 114 and the cam post 112 when the handle 106 rotates in a second direction (or a clockwise direction 140) according to an example embodiment.

As discussed above, in an example embodiment, to transition the clamping apparatus from the clamped state to the unclamped state, the handle 106 is rotated in a counterclockwise direction 138. For example, FIGS. 11A-13B illustrate a rotational progression of the handle 106 in the counterclockwise direction 138. As shown, the handle 106 is configured to transition from the position shown in FIG. 11A to the position shown in FIG. 12A by rotating in the counterclockwise direction 138. In addition, the handle 106 is configured to transition from the position shown in FIG. 12A to the position shown in FIG. 13A by rotating in the counterclockwise direction 138.

Figure 11A:
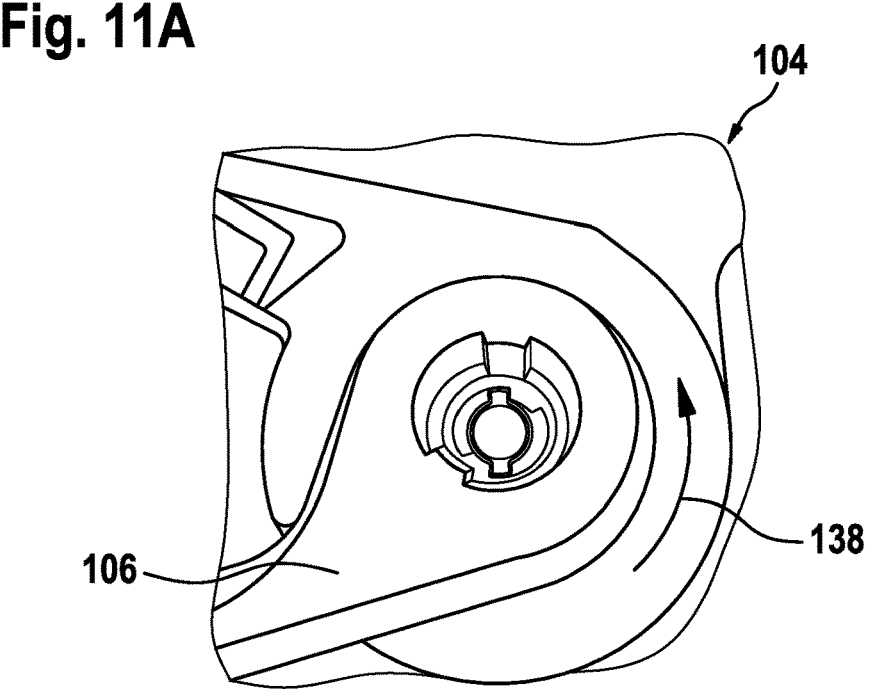
FIG. 11A is an enlarged view of a handle when a clamping apparatus is in a clamped state according to an example embodiment of this disclosure.
Figure 11B:
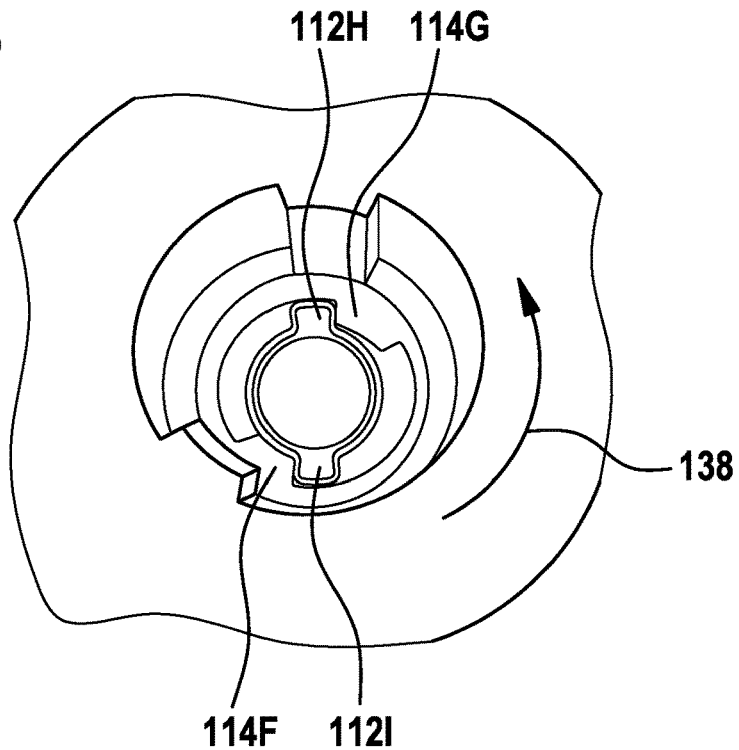
FIG. 11B is an enlarged view of the cam post and the handle plate of FIG. 11A according to an example embodiment of this disclosure.

FIG. 11A illustrates the handle 106 in a first position in which the clamping apparatus is in the clamped state according to an example embodiment. Meanwhile, FIG. 11B is an enlarged view of the handle plate 114 and the cam post 112 of FIG. 11A. As shown, when the handle 106 is in this first position, the first tab 114F of the handle plate 114 is in contact with the second protrusion 112I of the cam post 112. In addition, when the handle 106 is in this first position, the second tab 114G of the handle plate 114 is in contact with the first protrusion 112H of the cam post 112. This engagement between the handle plate 114 and the cam post 112 is configured to assist in rotating the cam post 112 and the cam 122 in the counterclockwise direction 138 when a force is applied to the handle 106.

For example, when in this clamped state, a movement of the handle 106 along the counterclockwise direction 138 is configured to cause the first tab 114F to abut or push against the second protrusion 114I and also cause the second tab 114G to abut or push against the first protrusion 112H. In accordance with this movement, the cam post 112 is configured to cause the cam 122 to rotate relative to the cam follower 124 such that the detents 122G and 122H move towards the first and second protruding members 124A and 124B. In addition, the spring 130 is configured to transition from a less compressed state to a more compressed state. Accordingly, the clamping apparatus is configured to transition from this clamped state to a transition state, such as that shown in FIGS. 12A-12B.

Figure 12A:
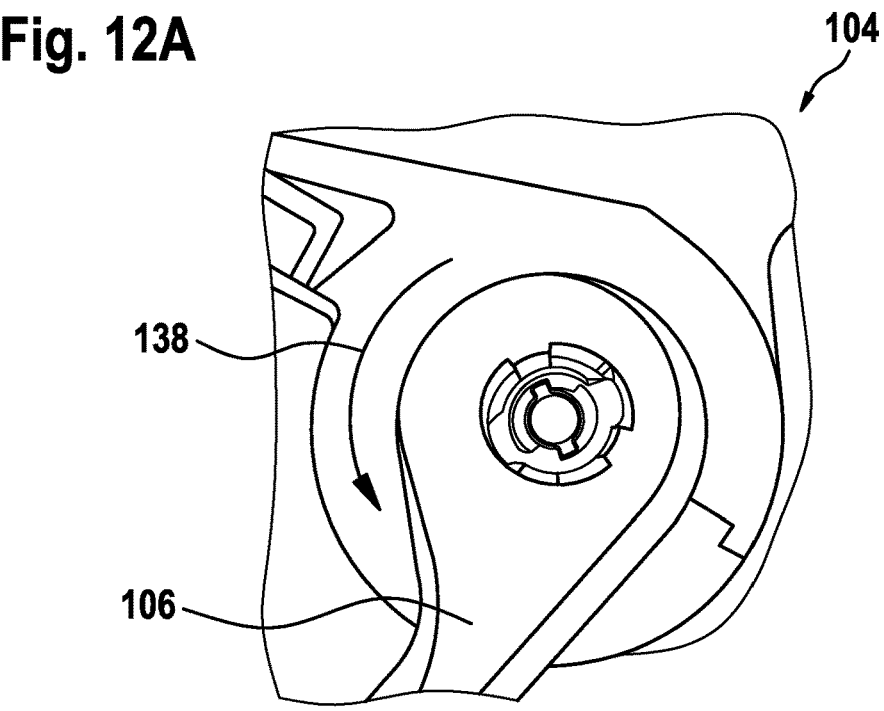
FIG. 12A is an enlarged view of a handle when a clamping apparatus is in a transition state according to an example embodiment of this disclosure.
Figure 12B:
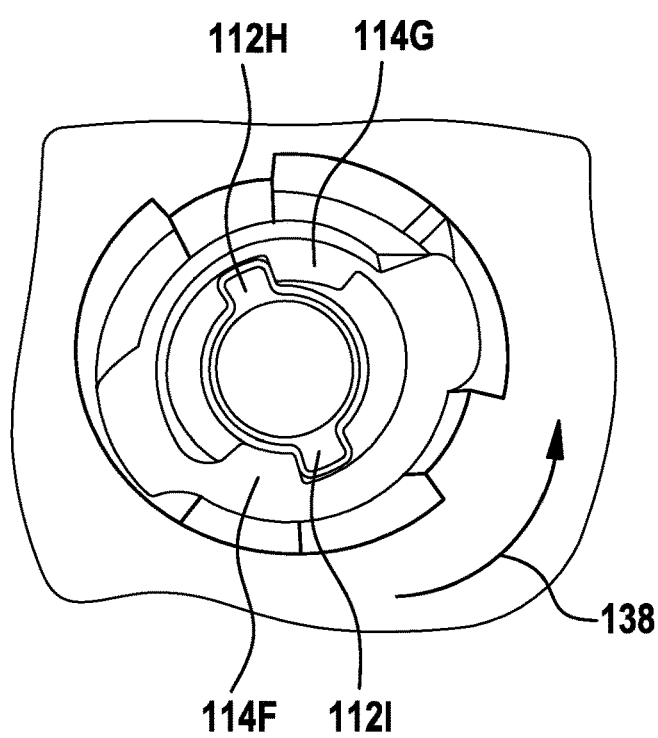
FIG. 12B is an enlarged view of the cam post and the handle plate of FIG. 12A according to an example embodiment of this disclosure.

FIG. 12A illustrates the handle 106 in a position in which the clamping apparatus is in a transition state between the clamped state and the unclamped state according to an example embodiment. Meanwhile, FIG. 12B is an enlarged view of the handle plate 114 and the cam post 112 of FIG. 12A. As shown, when the handle 106 is in this transitional position, the first tab 114F of the handle plate 114 is in contact with the second protrusion 112I of the cam post 112. In addition, when the handle 106 is in this transitional position, the second tab 114G of the handle plate 114 is in contact with the first protrusion 112H of the cam post 112. This engagement between the handle plate 114 and the cam post 112 is configured to assist in rotating the cam post 112 and the cam 122 in the counterclockwise direction 138 when a force is applied to the handle 106.

For example, when in this transition state, a movement of the handle 106 along the counterclockwise direction 138 is configured to cause the first tab 114F to abut or push against the second protrusion 112I and also cause the second tab 114G to abut or push against the first protrusion 112H. In accordance with this movement, the cam post 112 is configured to cause the cam 122 to rotate relative to the cam follower 124 such that the detents 122G and 122H move further towards the first and second protruding members 124A and 124B. In addition, the spring 130 is configured to transition from a less compressed state to a more compressed state. Accordingly, the clamping apparatus is configured to transition from this transition state to the unclamped state, such as that shown in FIGS. 13A-13B.

Figure 13A:
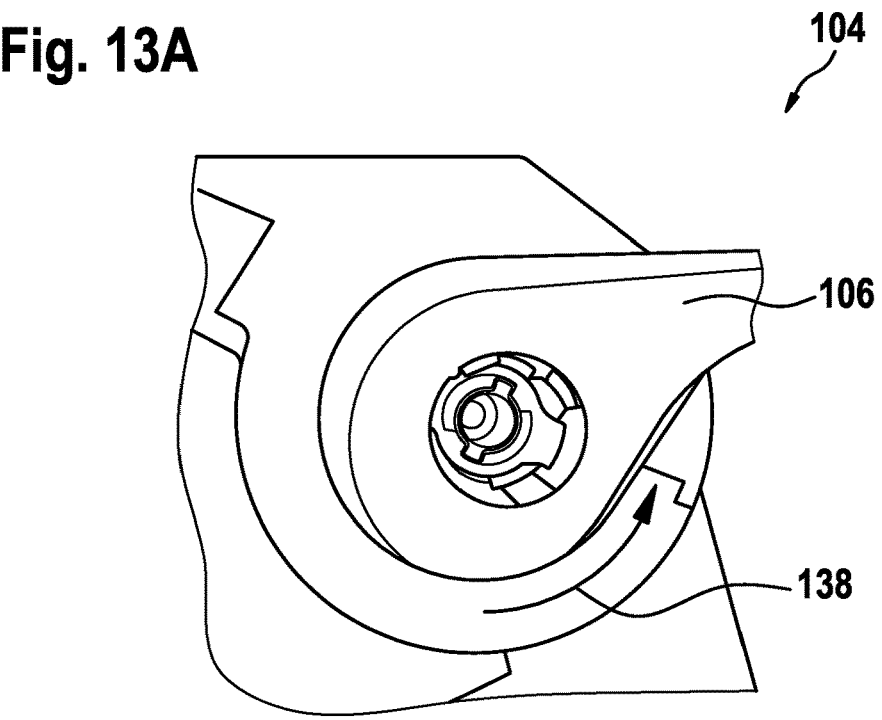
FIG. 13A is an enlarged view of a handle when a clamping apparatus is in an unclamped state according to an example embodiment of this disclosure.
Figure 13B:
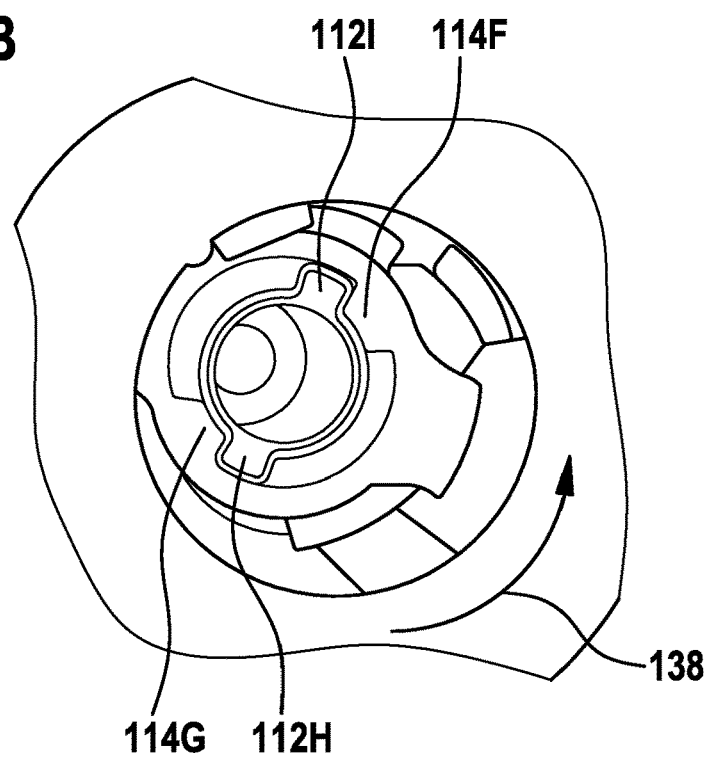
FIG. 13B is an enlarged view of the cam post and the handle plate of FIG. 13A according to an example embodiment of this disclosure.

FIG. 13A illustrates the handle 106 in the second position in which the clamping apparatus is in an unclamped state. Meanwhile, FIG. 13B is an enlarged view of the handle plate 114 and the cam post 112 of FIG. 13A. As shown, when the handle 106 is in this second position, the second tab 114G of the handle plate 114 is in contact with the first protrusion 112H of the cam post 112. In addition, as shown, when the handle 106 is in this second position, the first tab 114F of the handle plate 114 is in contact with the second protrusion 112I of the cam post 112. Moreover, when the handle 106 is in this second position, the first and second protruding members 124A and 124B of the cam follower 124 are positioned within the detents 122G and 122H of the cam 122 such that the cam 122 is maintained in the unclamped position. In addition, when the handle 106 is in this second position, the spring 130 is more compressed in this unclamped state (FIG. 4B) than in the clamped state (FIG. 4A). Accordingly, while in this unclamped state, the clamping action between the first clamping member 110A and the second clamping member 128 is released. In addition, while in this unclamped state, the clamping apparatus includes the gap G such that any suitable accessory 108 is enabled to be inserted or removed from between the first clamping member 110A and the second clamping member 128.

Furthermore, in this example embodiment, to transition the clamping apparatus from the unclamped state to the clamped state, the handle 106 is rotated in a clockwise direction 140. For example, as discussed above, FIG. 13A illustrates the handle 106 in the second position in which the clamping apparatus is in an unclamped state. Meanwhile, FIGS. 14A-16B illustrate a rotational progression of the handle 106 in the clockwise direction 140 from the unclamped state shown in FIG. 13A to a clamped state shown in FIG. 16A. In this regard, for example, the handle 106 is configured to transition from the second position shown in FIG. 13A to the transitional position shown in FIG. 14A by rotating in a clockwise direction 140. In addition, the handle 106 is configured to transition from the transitional position shown in FIG. 14A to another transitional position shown in FIG. 15A by rotating in the clockwise direction 140. Also, the handle 106 is configured to transition from the transitional position shown in FIG. 15A to the first position shown in FIG. 16A by rotating in the clockwise direction 140.

Figure 14A:
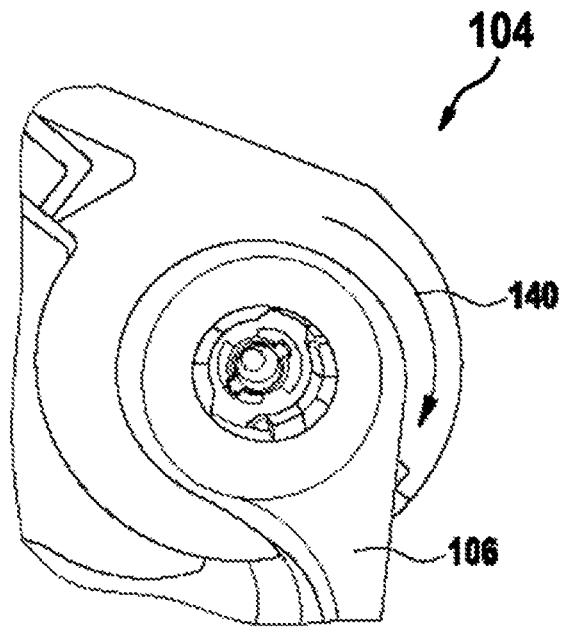
FIG. 14A is an enlarged view of a handle when a clamping apparatus is in a transition state according to an example embodiment of this disclosure.
Figure 14B:
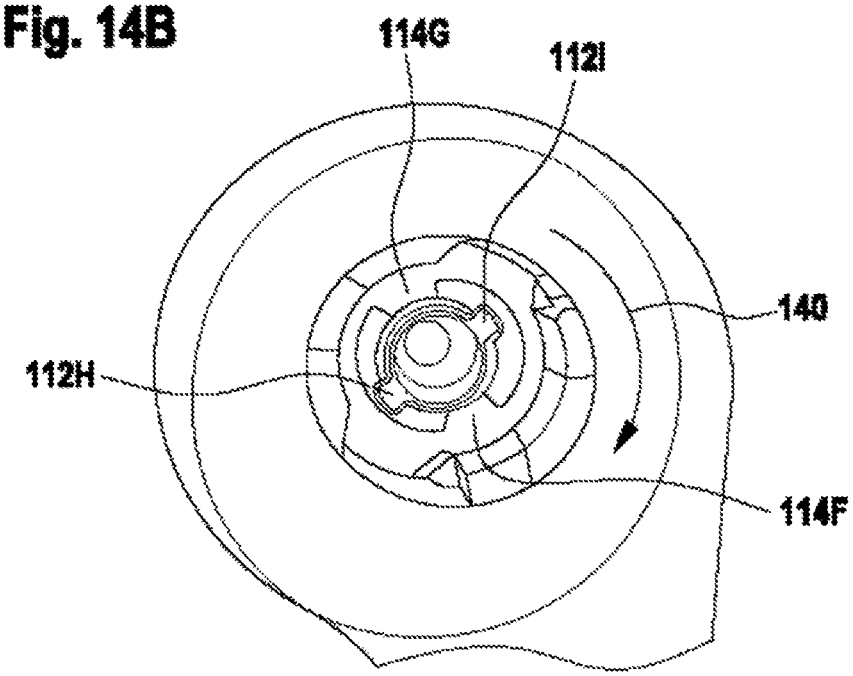
FIG. 14B is an enlarged view of the cam post and the handle plate of FIG. 14A according to an example embodiment of this disclosure.

FIG. 14A illustrates the handle 106 in a transitional position in which the clamping apparatus is in a transition state between the unclamped state and the clamped state according to an example embodiment. Meanwhile, FIG. 14B is an enlarged view of the handle plate 114 and the cam post 112 of FIG. 14A. According to an example embodiment, when the handle 106 is in this transitional position, the first tab 114F of the handle plate 114 is configured to move within the second space 112K (FIG. 7D) between the first protrusion 112H and the second protrusion 112I. In addition, when the handle 106 is in this transitional position, the second tab 114G of the handle plate 114 is configured to move within the first space 112J (FIG. 7D) between the first protrusion 112H and the second protrusion 112I.

More specifically, FIGS. 14A-14B illustrate an instance in which the first tab 114F is spaced from the first protrusion 112H and the second protrusion 112I. In addition, FIGS. 14A-14B illustrate an instance in which the second tab 114G is spaced from the first protrusion 112H and the second protrusion 112I. That is, while the handle 106 is in this transitional position, the first tab 114F is not in contact with the first protrusion 112H or the second protrusion 112I. Also, while the handle 106 is in this transitional position, the second tab 114G is not in contact with the first protrusion 112H or the second protrusion 112I.

In an example embodiment, when the handle 106 rotates from the second position (FIGS. 13A-13B) towards this transitional position (FIGS. 14A-14B), the first tab 114F of the handle plate 114 moves away from the second protrusion 112I of the cam post 112. Also, in this case, the second protrusion 112I of the cam post 112 is prevented from moving in the clockwise direction 140 at least since the cam 122 (and hence the cam post 112) is held in place via the cam follower 124, as the first and second protruding members 124A and 124B are positioned within the first and second detents 122G and 122H. Accordingly, with this rotation of the handle 106, the distance between the first tab 114F and the second protrusion 112I increases and allows for the handle plate 114 (and thus the handle 106) to move safely and independently from the cam post 112 (and thus the cam 122) such that the handle 106 does not experience the kick-back via movements of the spring 130 and the cam 122.

In addition, when the handle 106 rotates from the second position (FIGS. 13A-13B) towards this transitional position (FIGS. 14A-14B), the second tab 114G of the handle plate 114 moves away from the first protrusion 112H of the cam post 112. Also, in this case, the first protrusion 112H of the cam post 112 is prevented from moving in the clockwise direction 140 at least since the cam 122 (and hence the cam post 112) is held in place via the cam follower 124, as the first and second protruding members 124A and 124B are positioned within the first and second detents 122G and 122H. Accordingly, with this rotation of the handle 106, the distance between the second tab 114G and the first protrusion 112H increases and allows for the handle plate 114 (and thus the handle 106) to move safely and independently from the cam post 112 (and thus the cam 122) such that the handle 106 does not experience the kick-back via movements of the spring 130 and the cam 122.

As discussed above, in an example embodiment, the handle 106 is configured to rotate in the clockwise direction 140 for a predetermined distance without causing the cam 122 to also rotate in the clockwise direction 140. More specifically, each of the first and second spaces 112J and 112K between the first and second tabs 112H and 112I provides sufficient clearance for the handle plate 114 to rotate in a controlled manner for a predetermined distance without kick-back. Advantageously, the control mechanism (e.g., the structures provided by the handle plate 114 and the cam post 112) enables the handle 106 to move independently of the cam 122 for a predetermined distance in the second direction in a safe manner without the fast and forceful movement of the spring 130 and the cam 122 affecting the movement of the handle 106. Advantageously, this also prevents the handle 106 from striking the fingers (or anything else in its path) upon transitioning the clamping apparatus from one state to another state (e.g., unclamped state to a clamped state).

Figure 15A:
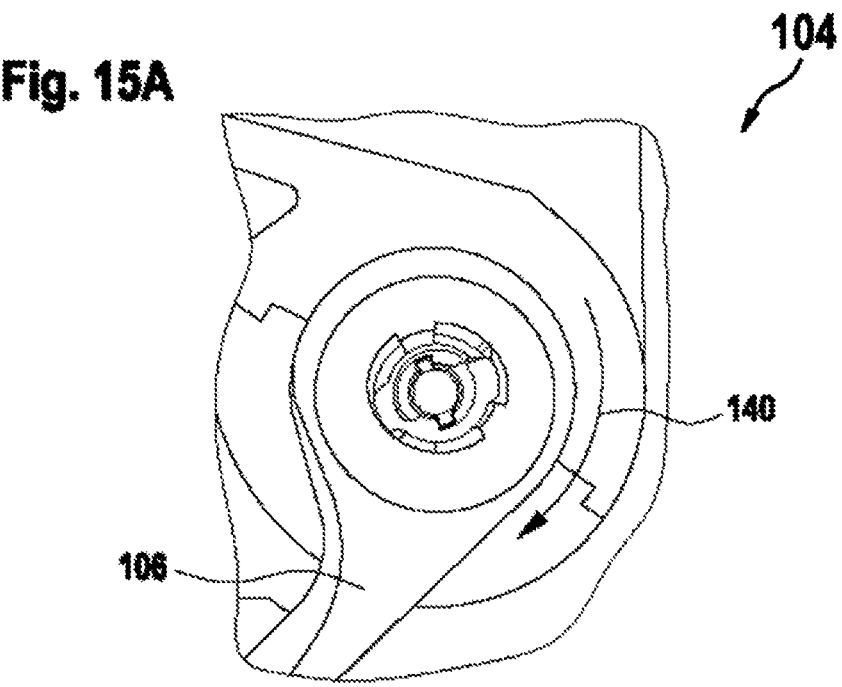
FIG. 15A is an enlarged view of a handle when a clamping apparatus is in a transition state according to an example embodiment of this disclosure.
Figure 15B:
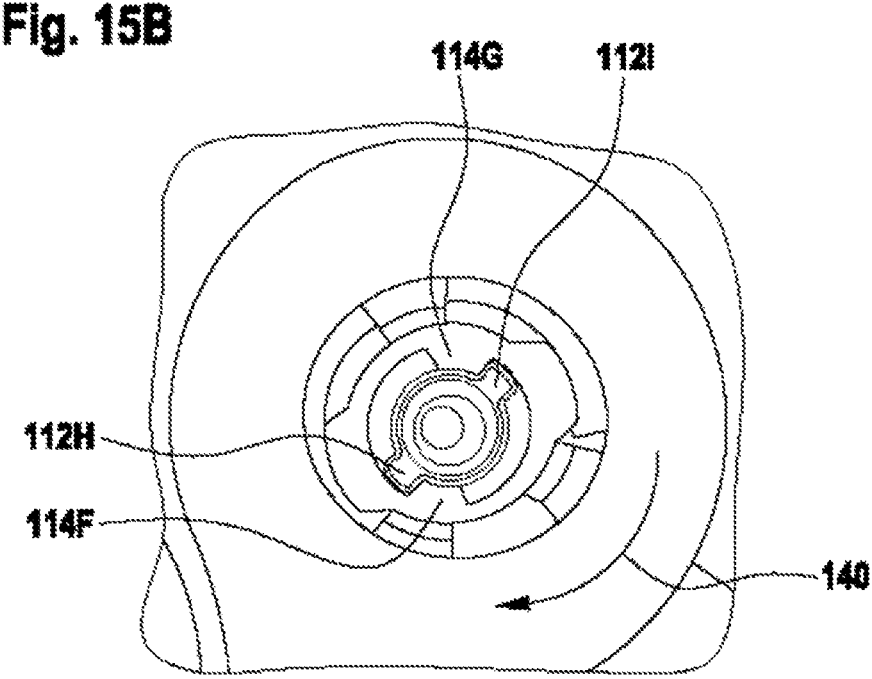
FIG. 15B is an enlarged view of the cam post and the handle plate of FIG. 15A according to an example embodiment of this disclosure.

FIG. 15A illustrates the handle 106 in a position in which the clamping apparatus is in a transition state between the unclamped state and the clamped state according to an example embodiment. Meanwhile, FIG. 15B is an enlarged view of the handle plate 114 and the cam post 112 of FIG. 15A. As shown, when the handle 106 is rotating in the clockwise direction 140, the first tab 114F of the handle plate 114 is configured to abut or push against the first protrusion 112H of the cam post 112 in the clockwise direction 140. Similarly, in this scenario, the second tab 114G of the handle plate 114 is configured to abut or push against the second protrusion 112I of the cam post 112 in the clockwise direction 140. This interaction of the first tab 114F and second tab 114G with the first protrusion 112H and the second protrusion 112I is configured to assist in rotating the cam post 112 and the cam 122 in the clockwise direction 140.

However, in this scenario, the continued rotation of the cam post 112 and the cam 122 is configured to release the first and second protruding members 124A and 124B from the detents 122G and 122H. As the first and second protruding members 124A and 124B are released from their respective detents 112G and 112H, the cam 122 is configured to rotate relative to the cam follower 124 such that the lower parts 122J and 122K move towards the first and second protruding members 124A and 124B. In addition to this movement of the cam 122 relative to the cam follower 124, the spring 130 transitions from a more compressed state to a less compressed state.

Figure 16A:
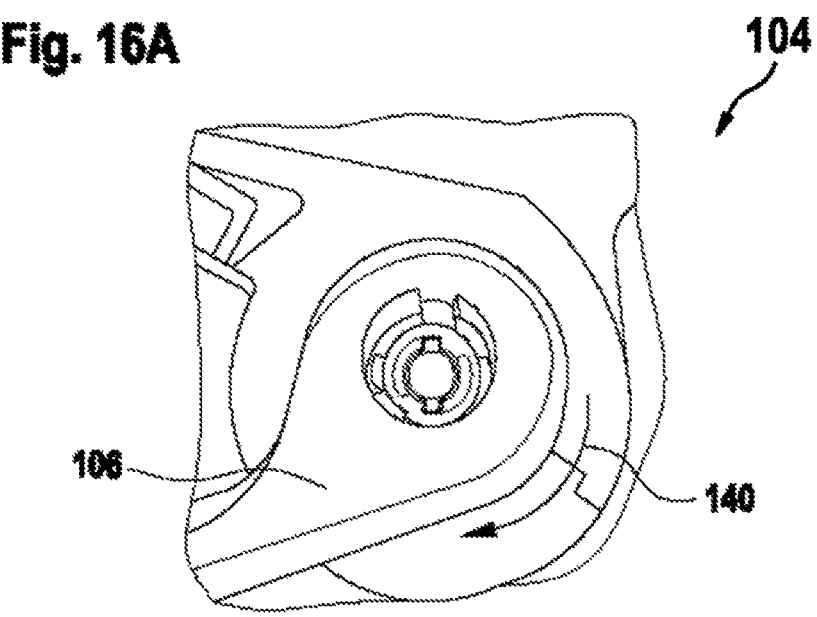
FIG. 16A is an enlarged view of a handle when a clamping apparatus is in a clamped state according to an example embodiment of this disclosure.
Figure 16B:
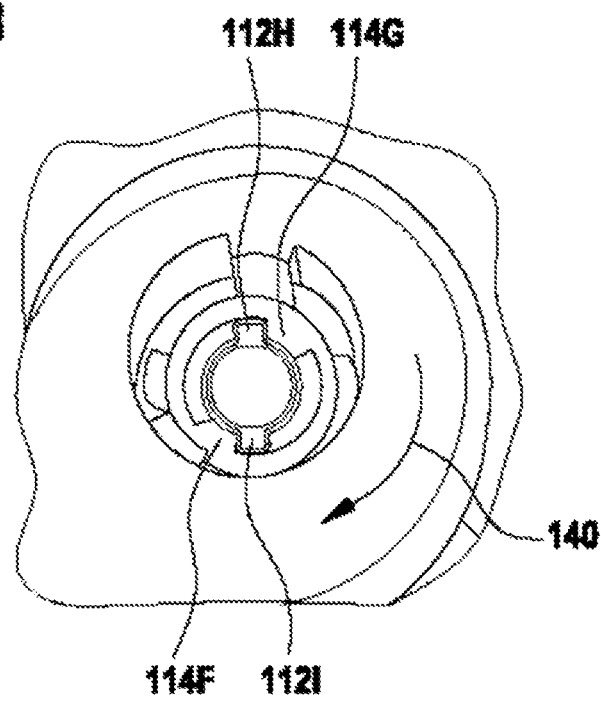
FIG. 16B is an enlarged view of the cam post and the handle plate of FIG. 16A according to an example embodiment of this disclosure.

In view of the above, the cam post 112 is configured to quickly rotate in the clockwise direction 140 from the transitional position, shown in FIGS. 15A-15B, to the first position, shown in FIGS. 16A-16B, due to the above-mentioned movements of the spring 130 and the cam 122. More specifically, in an example embodiment, the first protrusion 112H of the cam post 112 is configured to move within the second clearance 114I of the handle plate 114. In addition, in an example embodiment, the second protrusion 112I of the cam post 112 is configured to move within the first clearance 114H of the handle plate 114. By providing the first clearance 114H and the second clearance 114I, the mechanical structure of the handle plate 114 enables this rotation of the cam post 112 to occur. Furthermore, this movement of the cam post 112 from FIG. 15A-15B to FIG. 16A-16B enables the cam 122 to rotate such that the clamping apparatus transitions to the clamped state, such as that shown in FIGS. 16A-16B.

FIG. 16A illustrates the handle 106 in a position in which the clamping apparatus is in the clamped state according to an example embodiment. Meanwhile, FIG. 16B is an enlarged view of the handle plate 114 and the cam post 112 of FIG. 16A. As shown, this clamped state of FIGS. 16A-16B is the same as or substantially similar to the clamped state of FIGS. 11A-11B. More specifically, when the handle 106 is in this first position, the first tab 114F of the handle plate 114 is in contact with the second protrusion 112I of the cam post 112. In addition, when the handle 106 is in this first position, the second tab 114G of the handle plate 114 is in contact with the first protrusion 112H of the cam post 112. This engagement between the handle plate 114 and the cam post 112 is configured to assist in rotating the cam post 112 and the cam 122 when a force is applied to the handle 106 in the counterclockwise direction 138 to transition the clamping apparatus out of this clamped state.

As aforementioned, in an example embodiment, while in this clamped state, a movement of the handle 106 along the counterclockwise direction 138 is configured to cause the first tab 114F to abut or push against the second protrusion 112I and cause the second tab 114G to abut or push against the first protrusion 112H. In accordance with this movement, the cam post 112 is configured to cause the cam 122 to rotate relative to the cam follower 124 such that the detents 122G and 122H move towards the first and second protruding members 124A and 124B. In addition, the spring 130 is configured to transition from a less compressed state to a more compressed state. Accordingly, the clamping apparatus is configured to transition out of this clamped state of FIG. 16B, as discussed above.

Furthermore, in addition to the above discussion, this disclosure further includes other embodiments, as discussed below. For example, although the control mechanism (and/or clamping apparatus) is discussed above with regard to an oscillating tool 100, the control mechanism (and/or clamping apparatus) is applicable or usable together with any suitable electrical device, electro-mechanical device, or mechanical device. For example, in an alternative embodiment (i.e., alternative to the oscillating tool 100), the clamping apparatus is applied to a circular saw (not shown) according to an example embodiment. For instance, the circular saw can be a mini or compact type that is configured, via the clamping apparatus, to attach any saw blade thereto by moving the lever (e.g., handle 106) into the requisite position and detach any saw blade therefrom by moving the lever (e.g., handle 106) into the other requisite position. Advantageously, in such an application, the saw blade of the mini or compact circular saw is able to be quickly changed in a safe and controlled manner via the clamping apparatus without experiencing any harmful kickback from the lever (e.g., handle 106).

In addition, although the cam post 112 and the cam 122 are discussed above as being distinct components that are connected to each other, according to an alternative example embodiment, the cam post 112 and the cam 122 are integrally formed as a monolithic structure. In this regard, for example, the cam post 112 and the cam 122 is integrally formed as one solid piece. Also, in yet an alternative example embodiment, the cam post 112 and the cam 122 form a single unit, which comprises a plurality of parts that are fixedly attached to each other by suitable means, such as by welding, adhesive, or the like.

Also, this disclosure includes other variations of the handle plate 114 and the handle 106. For example, in an alternative embodiment, the handle plate 114 is securely embedded within the handle 106 by various fabrication and mechanical means such that fasteners, such as screws 116, are not required to attach the handle plate 114 to the handle 106. As one example, the handle 106 is molded or plated together with the handle plate 114.

Furthermore, although the handle plate 114 and the handle 106 are discussed above as being distinct components that are connected to each other, according to an alternative example embodiment, the handle plate 114 and the handle 106 are integrally formed as a monolithic structure. In this regard, for example, the handle plate 114 and the handle 106 is integrally formed as one solid piece, e.g. a single metal piece or a single plastic piece that has been insert-molded. Also, in yet an alternative example embodiment, the handle plate 114 and the handle 106 form a single unit, which comprises a plurality of parts that are fixedly attached to each other by suitable means, such as by welding, adhesive, or the like.

That is, the above description is intended to be illustrative, and not restrictive, and is provided in the context of a particular application and its requirements. Those skilled in the art can appreciate from the foregoing description that this disclosure may be implemented in a variety of forms, and that the various embodiments may be implemented alone or in combination. Therefore, while the embodiments of this disclosure have been described in connection with particular examples thereof, the general principles defined herein may be applied to other embodiments and applications without departing from the spirit and scope of the described embodiments, and the true scope of the embodiments and/or methods of this disclosure are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A clamping apparatus with a control mechanism comprising:
   a cam configured to rotate into a clamped position in which the clamping apparatus is in a clamped state and an unclamped position in which the clamping apparatus is in an unclamped state;
   a cam follower configured to engage with the cam;
   a cam post configured to rotate with the cam;
   a handle movable into a first position and a second position;
   a handle plate configured to rotate with the handle, wherein:
      the handle plate is configured to rotate the cam post in a first direction when the handle moves from the first position to the second position,
      the handle plate is configured to rotate independently of the cam post in a second direction for a predetermined distance when the handle moves from the second position to the first position,
      the first direction is opposite to the second direction, and
      the cam follower includes protruding members that are configured to hold the cam in the unclamped position when the handle plate rotates in the second direction for the predetermined distance.

2. The clamping apparatus with the control mechanism of claim 1, wherein the first position of the handle corresponds to the clamped state and the second position of the handle corresponds to the unclamped state.

3. The clamping apparatus with the control mechanism of claim 1, wherein:
   the cam post includes a first protrusion and a second protrusion, the first and second protrusions being disposed at diametrically opposite locations of the cam post, and
   the handle plate is configured to abut against the first and second protrusions to rotate the cam post in the first direction.

4. The clamping apparatus with the control mechanism of claim 3, wherein:
   the handle plate comprises a metal material, and
   the handle plate includes a first tab and a second tab that are configured to abut against the first protrusion and the second protrusion of the cam post.

5. The clamping apparatus with the control mechanism of claim 4, wherein the first tab and the second tab are disposed at diametrically opposite locations of the handle plate.

6. The clamping apparatus with the control mechanism of claim 3, wherein:
   the handle plate includes a first clearance and a second clearance, and
   the first and second clearances provide space for the first and second protrusions of the cam post to rotate in the second direction without rotating the handle plate in the second direction such that the cam post is enabled to rotate into the clamped position.

7. The clamping apparatus with the control mechanism of claim 1, wherein the cam post and the cam are integrally formed as a monolithic structure.

8. The clamping apparatus with the control mechanism of claim 1, wherein the cam and the cam post are distinct parts that are connected via mating structures on the cam and the cam post.

9. A power tool comprising:
a clamping apparatus that includes at least (a) a cam configured to rotate into a clamped position in which the clamping apparatus is in a clamped state and an unclamped position in which the clamping apparatus is in an unclamped state, (b) a cam follower configured to engage with the cam, and (c) a handle movable into a first position and a second position; and
a control mechanism that includes (a) a cam post rotatable with the cam, and (b) a handle plate rotatable with the handle,
wherein:
the handle plate is configured to rotate the cam post in a first direction when the handle moves from the first position to the second position,
the handle plate is configured to rotate independently of the cam post in a second direction for a predetermined distance when the handle moves from the second position to the first position,
the first direction is opposite to the second direction, and
the cam follower includes protruding members that are configured to hold the cam in the unclamped position when the handle plate rotates in the second direction for the predetermined distance.

10. The power tool of claim 9, wherein the first position of the handle corresponds to the clamped state and the second position of the handle corresponds to the unclamped state.

11. The power tool of claim 10, wherein the cam and the cam post are distinct parts that are connected via mating structures on the cam and the cam post.

12. The power tool of claim 9, wherein:
the cam post includes a first protrusion and a second protrusion, the first and second protrusions being disposed at diametrically opposite locations of the cam post, and
the handle plate is configured to abut against the first and second protrusions to rotate the cam post in the first direction.

13. The power tool of claim 12, wherein:
the handle plate comprises a metal material, and
the handle plate includes a first tab and a second tab that are configured to abut against the first protrusion and the second protrusion of the cam post.

14. The power tool of claim 13, wherein the first tab and the second tab are disposed at diametrically opposite locations of the handle plate.

15. The power tool of claim 12, wherein:
the handle plate includes a first clearance and a second clearance, and
the first and second clearances provide space for the first and second protrusions of the cam post to rotate in the second direction without rotating the handle plate in the second direction such that the cam post is enabled to rotate into the clamped position.

16. An oscillating tool comprising:
a clamping apparatus that includes at least (a) a cam configured to rotate into a clamped position in which the clamping apparatus is in a clamped state and an undamped position in which the clamping apparatus is in an unclamped state and (b) a handle movable into a first position and a second position; and
a control mechanism that includes (a) a cam post rotatable with the cam, and (b) a handle plate rotatable with the handle,
wherein:
the handle plate is configured to rotate the cam post in a first direction when the handle moves from the first position to the second position,
the handle plate is configured to rotate independently of the cam post in a second direction for a predetermined distance when the handle moves from the second position to the first position,
the first direction is opposite to the second direction, and
the oscillating tool is configured to hold an accessory between clamping members when the clamping apparatus is in the clamped state and release the hold on the accessory between the clamping members when the clamping apparatus is in the unclamped state, the accessory being a cutting tool, a sanding tool, or a scraping tool.

17. The oscillating tool of claim 16, wherein the first position of the handle corresponds to the clamped state and the second position of the handle corresponds to the unclamped state.

18. The oscillating tool of claim 16, wherein:
the cam post includes a first protrusion and a second protrusion, the first and second protrusions being disposed at diametrically opposite locations of the cam post, and
the handle plate is configured to abut against the first and second protrusions to rotate the cam post in the first direction.

19. The oscillating tool of claim 18, wherein:
the handle plate includes a first clearance and a second clearance, and
the first and second clearances provide space for the first and second protrusions of the cam post to rotate in the second direction without rotating the handle plate in the second direction such that the cam post is enabled to rotate into the clamped position.

20. The oscillating tool of claim 16, further comprising:
a cam follower configured to engage with the cam, the cam follower including protruding members that are configured to hold the cam in the unclamped position while the handle plate rotates in the second direction for the predetermined distance.

* * * * *

UNITED STATES PATENT AND TRADEMARK OFFICE
CERTIFICATE OF CORRECTION

PATENT NO. : 10,213,897 B2  
APPLICATION NO. : 15/471920  
DATED : February 26, 2019  
INVENTOR(S) : Bernardi et al.

Page 1 of 1

It is certified that error appears in the above-identified patent and that said Letters Patent is hereby corrected as shown below:

In the Claims

In Column 22, Lines 4-5 of Claim 16 should read:
the clamping apparatus is in a clamped state and an
unclamped position in which the clamping apparatus is Signed and Sealed this
Eleventh Day of June, 2019

Andrei Iancu
*Director of the United States Patent and Trademark Office*